US010702966B2

(12) United States Patent
Vianello

(10) Patent No.: US 10,702,966 B2
(45) Date of Patent: Jul. 7, 2020

(54) AUTOMATIC MACHINE AND METHOD FOR AUTOMATICALLY DRILLING AND MILLING GLASS SHEETS ARRANGED VERTICALLY

(71) Applicant: FOREL SPA, Roncade (IT)

(72) Inventor: Fortunato Vianello, Roncade (IT)

(73) Assignee: FOREL SPA, Roncade (IT)

( * ) Notice: Subject to any disclaimer, the term of this patent is extended or adjusted under 35 U.S.C. 154(b) by 217 days.

(21) Appl. No.: 15/517,448

(22) PCT Filed: Oct. 8, 2015

(86) PCT No.: PCT/IB2015/057703
§ 371 (c)(1),
(2) Date: Apr. 6, 2017

(87) PCT Pub. No.: WO2016/055966
PCT Pub. Date: Apr. 14, 2016

(65) Prior Publication Data
US 2017/0304982 A1 Oct. 26, 2017

(30) Foreign Application Priority Data
Oct. 9, 2014 (IT) .............................. TV2014A0144

(51) Int. Cl.
B24B 9/10 (2006.01)
B23Q 7/05 (2006.01)
(Continued)

(52) U.S. Cl.
CPC ................ B24B 9/10 (2013.01); B23B 39/22 (2013.01); B23C 1/045 (2013.01); B23P 23/02 (2013.01);
(Continued)

(58) Field of Classification Search
CPC ....... B24B 9/10; B24B 9/102; B24B 27/0023; B24B 27/0076; B24B 27/0069;
(Continued)

(56) References Cited

U.S. PATENT DOCUMENTS

RE29,097 E * 1/1977 Bando ..................... B24B 9/102
451/260
5,807,166 A * 9/1998 Bando ....................... B24B 9/10
451/242
(Continued)

FOREIGN PATENT DOCUMENTS

CN 102335972 A 2/2012
CN 203187555 U 9/2013
(Continued)

OTHER PUBLICATIONS

Machine Translation DE 29621422 U1, which DE '422 was published Apr. 1998.*
(Continued)

Primary Examiner — Erica E Cadugan
(74) Attorney, Agent, or Firm — Cantor Colburn LLP

(57) ABSTRACT

An automatic machine for drilling and milling substantially flat glass sheets shape, comprising includes a machine body; an input conveyor provided with a motorized roller conveyor or roller belt that conveys the glass sheet by its lower edge; an input conveyance surface provided with idle gliding wheels; an output conveyor provided with a motorized roller conveyor or motorized belt that conveys the glass sheet by means of its lower edge; and an output conveyance surface provided with idle gliding wheels. The machine further includes at least one carriage provided with synchronous horizontal motion along the longitudinal axis X2; and at least one pair of working heads provided independently with a synchronous vertical motion for adjustment and feeding along the axes Y1 and Y2, wherein, each head bears
(Continued)

a tool provided with rotary motion (cutting) and feeding motion along the axes Z1 and Z2.

14 Claims, 22 Drawing Sheets

(51) Int. Cl.

| | | |
|---|---|---|
| *B23Q 7/04* | (2006.01) | |
| *B23Q 39/02* | (2006.01) | |
| *B23B 39/22* | (2006.01) | |
| *B23C 1/04* | (2006.01) | |
| *B23P 23/02* | (2006.01) | |
| *B23Q 3/157* | (2006.01) | |
| *B28D 1/18* | (2006.01) | |
| *B28D 1/14* | (2006.01) | |
| *B28D 7/04* | (2006.01) | |
| *B24B 27/00* | (2006.01) | |
| *B28D 1/00* | (2006.01) | |
| *B23Q 3/155* | (2006.01) | |
| *B23Q 39/00* | (2006.01) | |
| *B23Q 1/62* | (2006.01) | |

(52) U.S. Cl.
CPC ...... *B23Q 3/15536* (2016.11); *B23Q 3/15706* (2013.01); *B23Q 7/042* (2013.01); *B23Q 7/055* (2013.01); *B23Q 39/025* (2013.01); *B24B 27/0023* (2013.01); *B24B 27/0069* (2013.01); *B28D 1/003* (2013.01); *B28D 1/14* (2013.01); *B28D 1/18* (2013.01); *B28D 7/04* (2013.01); *B23B 2226/45* (2013.01); *B23B 2260/118* (2013.01); *B23Q 1/626* (2013.01); *B23Q 2039/002* (2013.01); *Y10T 29/49996* (2015.01); *Y10T 29/5107* (2015.01); *Y10T 408/378* (2015.01); *Y10T 408/554* (2015.01); *Y10T 409/30532* (2015.01); *Y10T 409/308344* (2015.01); *Y10T 483/1793* (2015.01)

(58) Field of Classification Search
CPC .. B23Q 39/025; B23Q 39/026; B23Q 39/027; B23Q 7/05; B23Q 7/055; B28D 7/04; B28D 7/046; Y10T 408/554; Y10T 408/378; B23B 2260/118; B23B 39/22; B23C 1/045

USPC .............................. 451/44, 331; 408/76, 37
See application file for complete search history.

(56) References Cited

U.S. PATENT DOCUMENTS

| | | | | |
|---|---|---|---|---|
| 5,971,680 | A * | 10/1999 | Kuo | ............... B23C 3/12 409/138 |
| 7,402,096 | B2 * | 7/2008 | Lisec | ............... B24B 9/10 451/54 |
| 7,771,248 | B2 * | 8/2010 | Vianello | ............... B24B 9/102 269/55 |
| 8,282,443 | B2 * | 10/2012 | Vianello | ............... B24B 47/22 451/178 |
| 2003/0015001 | A1 | 1/2003 | Tamburini et al. | |
| 2004/0076771 | A1 | 4/2004 | Marocco | |
| 2005/0011229 | A1 * | 1/2005 | Lisec | ............... B65G 49/061 65/182.2 |
| 2009/0022558 | A1 * | 1/2009 | Bando | ............... B23B 35/00 408/1 R |

FOREIGN PATENT DOCUMENTS

| | | | |
|---|---|---|---|
| CN | 103753368 A * | 4/2014 | |
| DE | 29621422 U1 | 4/1998 | |
| DE | 20218341 U1 * | 2/2003 | ............... B24B 9/10 |
| EP | 1270142 A2 | 1/2003 | |
| EP | 1270147 A2 | 1/2003 | |
| EP | 1314513 A2 * | 5/2003 | ............... B24B 9/102 |
| EP | 1818150 A1 | 8/2007 | |
| EP | 2631048 A1 | 8/2013 | |
| EP | 2719501 A1 * | 4/2014 | ............... B24B 41/02 |
| EP | 3045281 A1 * | 7/2016 | ............... B28D 1/003 |
| EP | 3106275 A1 * | 12/2016 | ............... B26D 7/0625 |
| JP | 11048013 A * | 2/1999 | |

OTHER PUBLICATIONS

Machine Translation of DE 20218341, which DE '341 was published Feb. 2003.*
Machine Translation of EP 1314513, which EP '513 was published May 2003.*
Machine Translation of CN 203187555-U, which CN '555 was published Sep. 2013.*
International Search Report dated Jan. 28, 2016 re: Application No. PCT/IB2015/057703; pp. 1-4; DE 296 21 422 U1, EP 2 631 048 A1, CN 203 187 555 U, EP 1 818 150 A1.

* cited by examiner

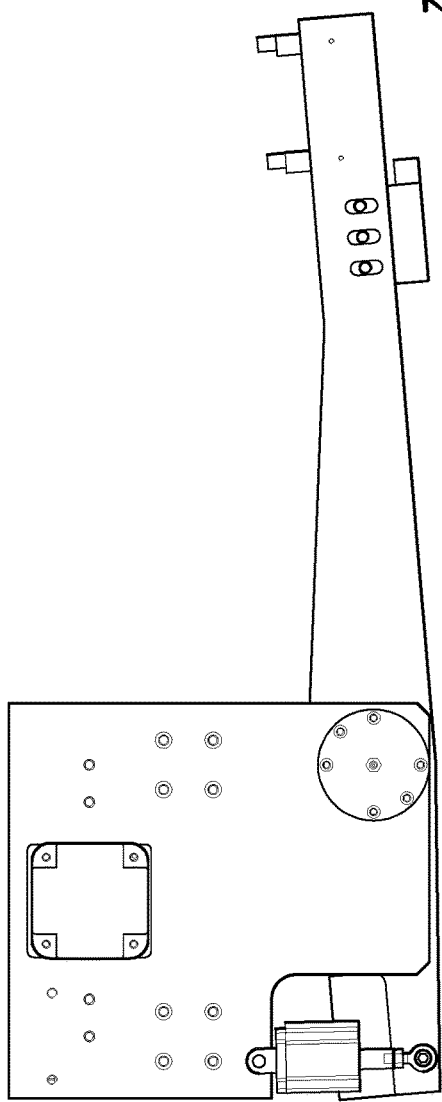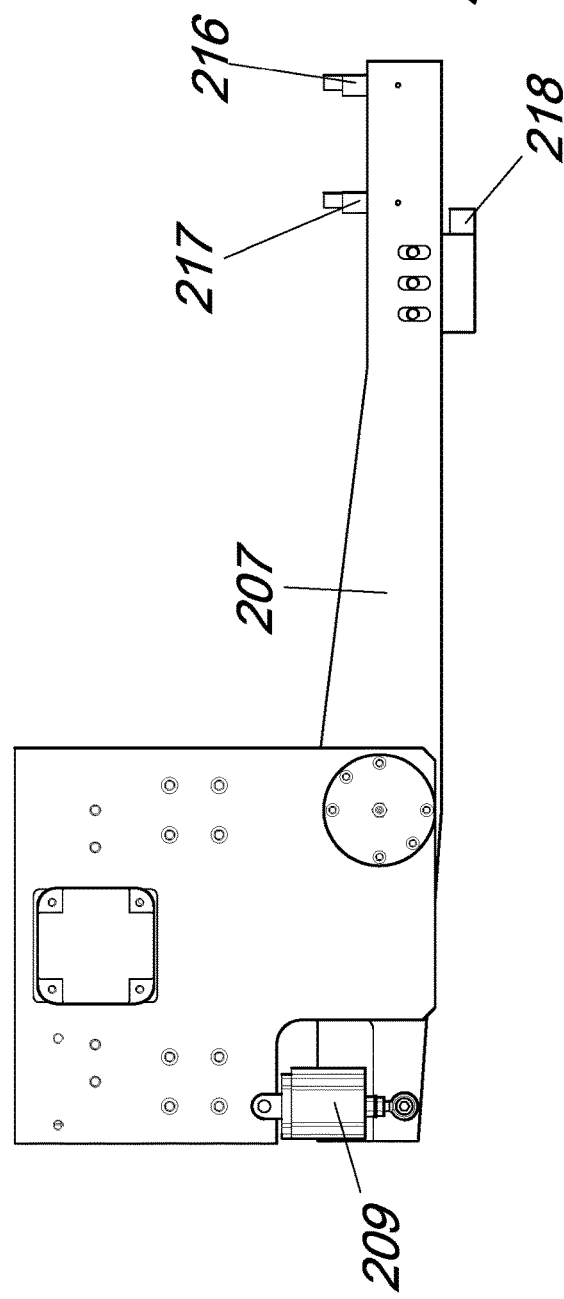

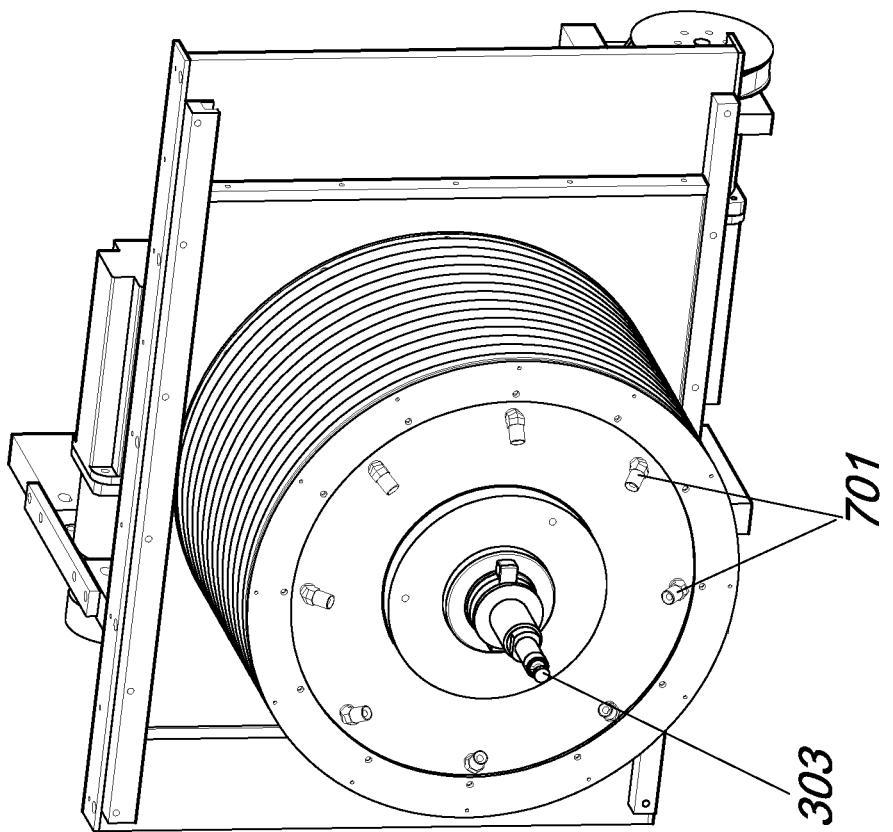
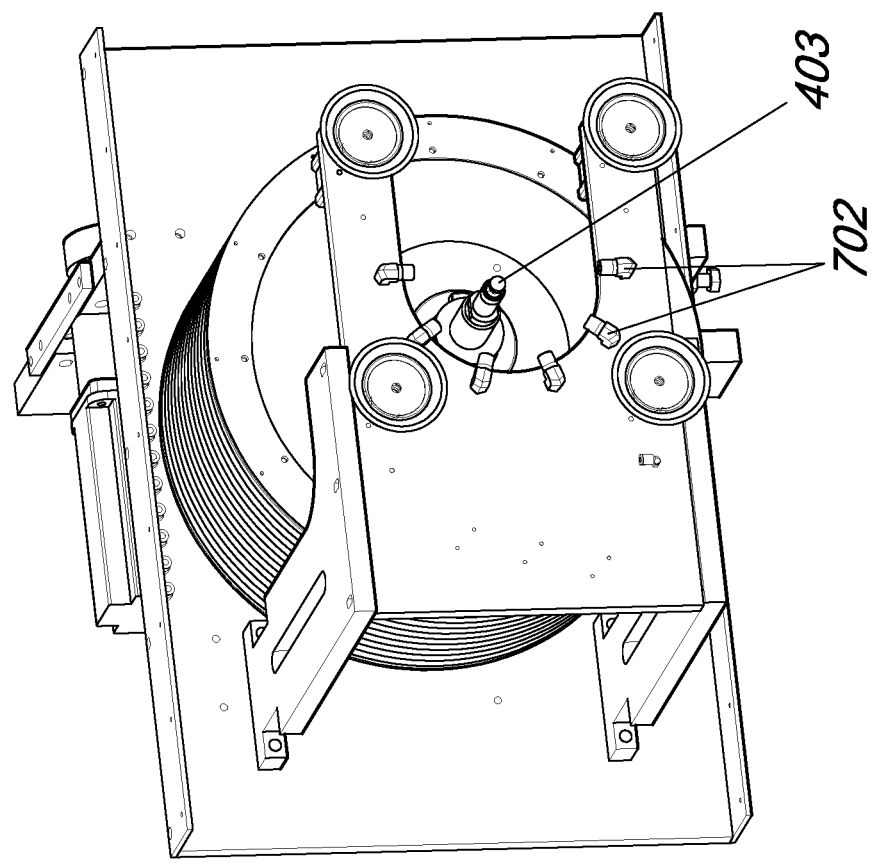
Fig. 13

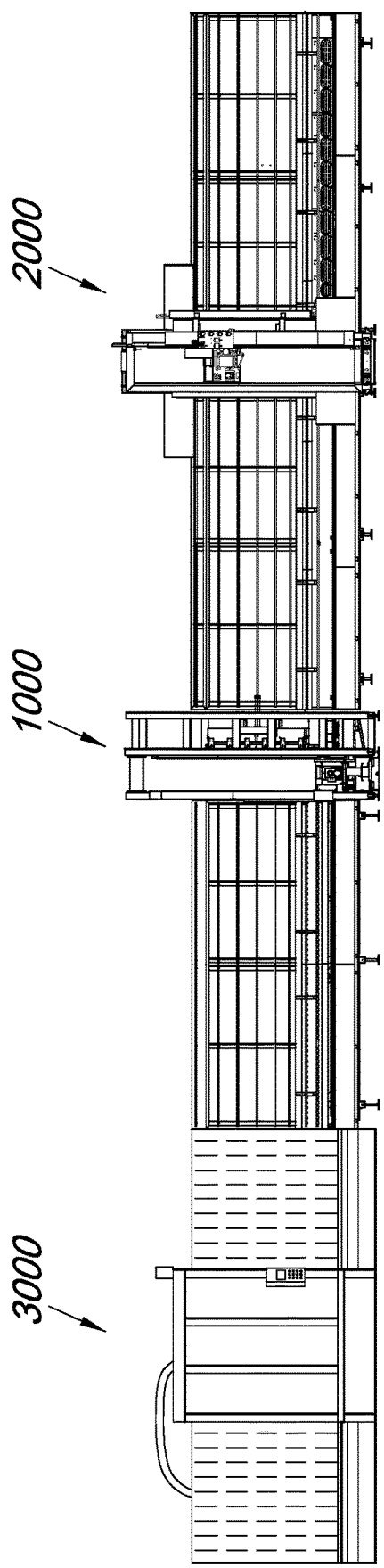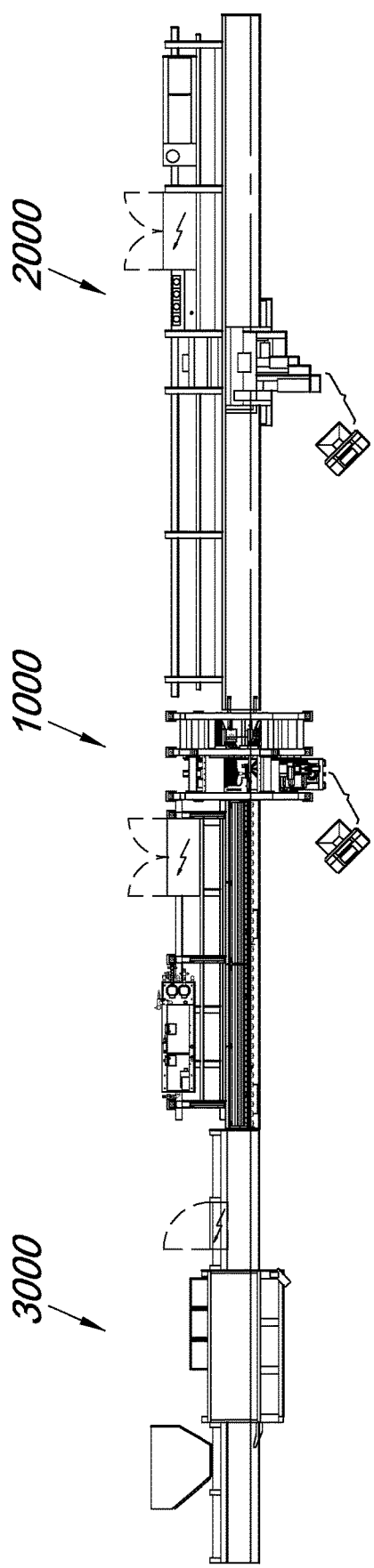

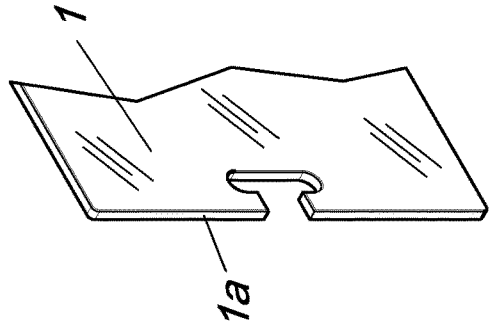
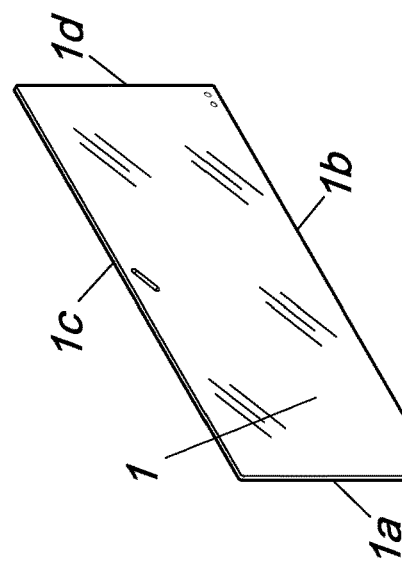
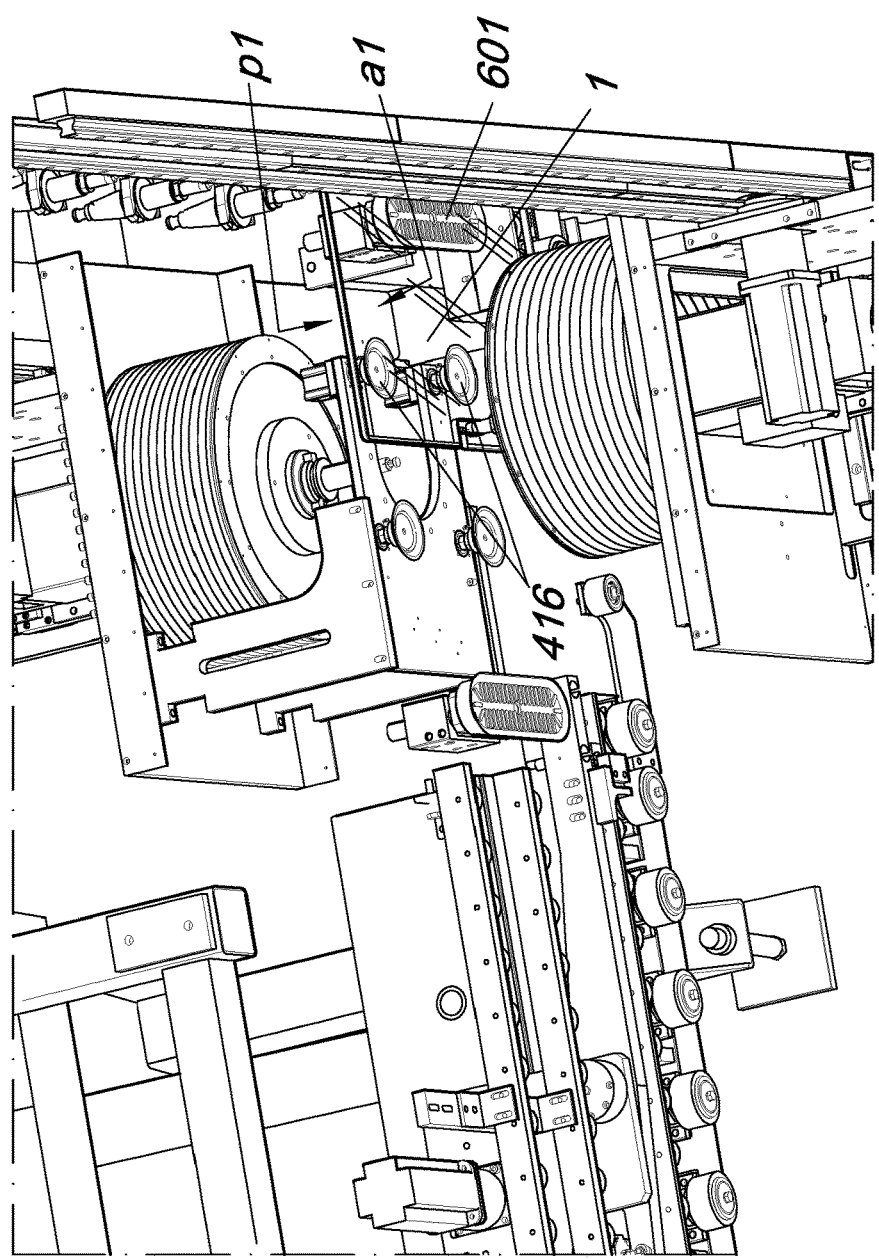
Fig. 19a
Fig. 19b
Fig. 19

Arrangement Comprising Belts for Supporting and Moving the Glass Sheet

Fig. 22

First Carriage 206 Provided with Means, For Example, Suckers or Clamps, For Coupling To The Glass Sheet 1

Fig. 23

AUTOMATIC MACHINE AND METHOD FOR AUTOMATICALLY DRILLING AND MILLING GLASS SHEETS ARRANGED VERTICALLY

TECHNICAL FIELD

The present disclosure relates to an automatic machine and to an automatic method for drilling and milling glass sheets, having a rectangular or other than rectangular shape, arranged vertically.

BACKGROUND

Methods are currently known for drilling and milling glass sheets, as obtained following cutting from the original production format to the destination formats and, in most cases, following the grinding of the perimetric edge. In principle, the grinding, drilling and milling operations can be applied to any step of the working of the glass sheet after cutting, for example before its use as is to compose the insulating glazing unit or as a mandatory operation before tempering or as preparation of the glass sheet to obtain a regular surface finish and geometry or for particular uses such as the composition of the structural insulating glazing unit.

The grinding of the perimetric edge is performed for several reasons, which are listed here not in order of importance: the first one relates to safety in handling the sheets, in which the edges would be dangerously sharp if they were not ground; the second one relates to the elimination of edge defects of the sheets, typically so-called "micro-cracks", which might trigger breakages of the sheet in the subsequent working steps (particularly tempering), as well as in subsequent states of transport or use; the third one can be simply in order to define the format of the glass sheet with better dimensions, geometry and surface finish than can have been obtained with the first work step, i.e., cutting, which leaves rough edges, and this is done for architectural uses, for use in interior decoration, and in particular for use in the composition of the structural insulating glazing unit (used as enclosure of buildings), the geometry of which is required to be precise in its dimensions and shape and the edge finish of which is required to be uniform in view of the optical effects linked to these configurations; additional reasons for resorting to grinding of the perimetric edge may be the most disparate.

In the case of architectural or interior decoration uses, the need is frequent to have glass sheets provided with holes with a generally beveled cylindrical geometry or with openings having a rectangular or contoured shape that affect or not the peripheral margin. A classic example is glass doors, where the interface with the hinges requires the presence of holes or openings and the interface with the handle or lock also requires the presence of holes or openings. Respectively, holes having a cylindrical, usually beveled, geometry are obtained by means of the drilling operation and the openings are obtained by means of the milling operation. Operations commonly already performed by means of machines known as drills for the first case, milling machines for the second case, or drills/milling machines for combined cases, but in manual or semiautomatic conditions (since the placement of the sheet and of the fixing constraints entail manual interventions) or automatic conditions (but with the problem of the vibration of the portion of the glass sheet proximate to the tool unsolved or partially solved).

The glass sheets can have different shapes depending on use: for example, they can be provided with coatings (of the reflective, low-emissivity, selective type) which provide barrier capabilities against optical radiation (both thermal and luminous); they can be composed of two or more glass sheets separated by one or more membranes of plastic material (of the type of PVB=Poly Vinyl Butyral type or of the EVA=Ethylene Vinyl Acetate type), which give intrusion prevention, vandalism prevention, bulletproofing, security characteristics; they can undergo the tempering treatment (after the grinding/drilling/milling operations), which gives the characteristic of fracture into microelements for safety purposes, such microelements not being able to injure. These three classes of shapes can be even combined with each other with various possibilities.

As regards the operations for drilling and milling glass sheets, protection at the industrial property level is particularly crowded, in view of the development of the use of glass sheets in architectural fields related to enclosures of buildings, stairs and railings, and to interior decoration, and in recent years also due to the spread of eastern manufacturers of machines dedicated to these operations.

A selection of the patent titles related to the most pertinent background art, with respect to the disclosure that will be described hereinafter, is as follows:

for the solution in which the sheet is arranged vertically and can move transversely with respect to the working bridge (or bridges) provided with the working head (or heads), the latter being movable transversely with respect to the glass sheet: CN 203187555(U), by Glassman Machinery Beijing Co. Ltd., filed May 8, 2013 and granted Sep. 11, 2013;

for the solution in which the sheet is arranged horizontally fixed and the working bridge can move longitudinally with respect to the glass sheet, provided with the working head, the latter being movable transversely with respect to the glass sheet (longitudinally is understood to be along the direction that is parallel to the long side of the glass sheet, transversely is understood to be along the direction that is parallel to the short side of the glass sheet): EP 1 270 147 A2, by Bimatech S.r.l., filed Jun. 18, 2002 with priority Jun. 19, 2001.

None of these disclosures leads to the inventive concept of the present application, which in summary includes performing, with a substantially vertical arrangement of the glass sheet having a rectangular or other than rectangular shape, in a single machine and automatically, the drilling and milling work in any portion of the glass sheet, keeping the glass sheet fixed during work with respect to the working bridges and keeping the portion affected by work validly stabilized against vibrations by way of mechanisms that interact with the plate at right angles, longitudinally and transversely and belong to the head of the two working heads that is not used for milling, and render the glass sheet integral with respect to the working bridges.

CN 203187555 (U) moves the glass sheet with respect to the working bridges during work that has a longitudinal orientation and during this work and also in other work the coupling with respect to the glass sheet, proximate to the portion of sheet affected by the work and therefore subjected to stresses and vibrations, acts only at right angles to said sheet and not in the longitudinal direction (i.e., on the plane of the glass sheet and parallel to its long side) and transverse direction (i.e., on the plane of the glass sheet and parallel to the short side thereof).

EP1270147 A2, in addition to acting on a sheet with a horizontal arrangement, uses an array of suckers constituted by n rows, each of which can be adjusted manually and in each of which m suckers are adjustable and can be activated automatically so that from 1 to n×m suckers can interact with the lower face of the glass sheet in order to retain such sheet proximate to all the regions in which it is worked. Therefore, fixing of the sheet during work is entrusted to a large plurality of suckers (which cannot always be arranged, or are difficult to arrange, in an ideal position to contrast vibrations and shear stresses produced by the working tools) and associated mechanisms, which moreover are not all automatic, and this entails excessive costs in investment, operation and maintenance. Moreover, this machine, by working with a horizontal arrangement of the glass sheet, entails complex operations that are onerous in terms of time and risky in terms of safety, since they are manual, though being controlled by lifting means, for loading and unloading the glass sheets. Moreover, since this machine does not have a tailstock, it cannot perform all types of drillings.

The background art also provides the solution of resorting, for the operations for drilling and milling glass sheets, to one or more nozzles that perform this work by means of a jet of water at extremely high pressure mixed with abrasive particles; however, this type, besides being beyond the scope of the IPC B24B9/10 classification, has aspects of considerable cost and technological complications for performing bevels or profiles that affect the thickness of the glass sheets.

SUMMARY

The aim of the subject matter of the present application is therefore to solve the described technical problems, eliminating all the drawbacks of the background art and thus providing an automatic machine and an automatic method that allow to drill and mill glass sheets safely, precisely and inexpensively, obtaining a superior qualitative result with respect to the background art or, for an equal qualitative result, by using a machine and a method that are far more convenient though being completely automatic.

Within this aim, the present disclosure provides a machine and method to automatically perform the drilling and milling operations in conditions of valid fixing of the work area against the stresses of the tools and vibrations, regardless of the position in which such operations are performed.

The present disclosure further provides a machine and method to avoid interfering, in terms of time, with the process for grinding the perimetric edge of the glass sheet, so that the productivity of the entire grinding and drilling and milling process is high.

The disclosure also provides a machine and method to eliminate the manual operations for loading and unloading the glass sheets or to perform them in work stations that are different from the ones dedicated to the grinding, drilling and milling processes.

These advantages and features that will become better apparent from the description that follows are achieved by providing an automatic machine and method for drilling and milling substantially flat glass sheets arranged vertically, comprising a machine body and at least two mutually opposite working heads, adapted to make contact with the faces of the glass sheet having any shape, in any position, said working heads being each provided with its own synchronous motion (independently of each other) along pseudo-vertical axes Y1 and Y2 and at least one of said heads being provided with a synchronous horizontal motion along the axis X1 and being each provided with a transverse motion, with respect to the faces of the glass sheet along the axes Z1 and Z2, each working head being provided with a spindle in order to impart the rotary motion to the respective tool; the tools being removable from tool magazines and returnable to the tool magazines by using the pseudo-vertical axes Y1 and Y2, in this case with the simple function of positioning for return of the tool used for the previous work (be it drilling or milling) and picking up the tool to be used in the subsequent work (be it drilling or milling).

Advantageously, the glass sheet has a vertical arrangement, or rather a slightly inclined arrangement with respect to the vertical, resting on a sliding surface, and can move horizontally on conveyors until it is arranged at the active region of the working heads, arranging itself at the desired height by way of the arrangement of a reference element that moves along the synchronous axis X2.

In the jargon of machine tools it is common to use the terms cutting motion, the one obtained by rotating the tool (already mentioned earlier); feeding or advancement motion, the one that moves the part (in our case, the glass sheet) being worked with respect to the tool, regardless of whether the part (in our case, the glass sheet) is stationary and the tool is moved or vice versa, for the case of our disclosure the situation is only of the first type and, as described in greater detail hereinafter, is obtained by actuating the axes Y1, X1, Z1, Z2; adjustment motion, the motion that mutually places the part (in our case, the glass sheet) and the tool in the situation for beginning work (or for beginning each work) and, as described hereinafter, is obtained by actuation of the axis X2, which provides the stop position of the part (in our case, the glass sheet) moved by one or more conveyors, for horizontal adjustment and for actuation of the axes Y1, Y2 for vertical adjustment and for actuation of the axes Z1, Z2 for transverse adjustment with respect to the part (in our case, the glass sheet). This premise has the purpose of introducing the terminology that will be used subsequently.

The arrangement of the glass sheet, where it is referenced as vertical, is actually to be understood as slightly inclined (usually by 6°) with respect to the vertical plane in order to give static stability to the glass sheet, i.e., prevent its tipping, both when it is stationary and all the more when it is being transported horizontally.

BRIEF DESCRIPTION OF THE DRAWINGS

Further characteristics and advantages of the disclosure will become better apparent from the following detailed description of a particular embodiment of the disclosure, illustrated by way of nonlimiting example in the accompanying drawings, wherein:

FIG. 1a is a partial detail view of FIG. 1;

FIGS. 10a and 10b show the assembly of the mechanisms, which belong to the carriage of the axis X2, which, by interfering with the front, be it vertical or inclined, of the glass sheet, produces its precise halting;

Respectively, FIG. 10a shows the situation in which the arm does not interfere with the glass sheet, in order to allow its transit; FIG. 10b shows the situation of contrast of the arm, particularly of its pad, to determine the slowing and halting of the glass sheet;

FIG. 13 shows the devices (nozzles) for cooling and lubrication of the front and rear tools. In addition to the function performed by these nozzles, the cooling/lubricants fluid can arrive at the work region also through the hollow part of said tool in the case of tools provided with a longitudinal central hole;

FIGS. 16a and 16b show respectively, in an elevation view (FIG. 16a) and in a plan view (FIG. 16b), an example of insertion of the machine 1000 according to the present disclosure in a more complete line, which comprises upstream the machine 2000 for the grinding of the perimetric edge and downstream the machine 3000 for washing the glass sheet since it is contaminated both by impurities deposited previously thereon and by the glass particles produced by grinding, drilling and milling.

FIGS. 18, 19, 19a, 19b and 20 show the arrangement of the glass sheet in the steps for positioning (FIG. 18), work (FIG. 19, highlighting the means activated to retain the glass sheet, FIGS. 19a and 19b) and evacuation (FIG. 20), showing an example of a milling that affects also the margin of the glass sheet and an example of oblique milling plus holes, but of course can be extrapolated to any other milling or drilling work or combination thereof, work that can be performed in any position of the glass sheet;

FIG. 22 is a schematic depiction of a variant; and

FIG. 23 schematically depicts a further feature of the carriage 206.

DETAILED DESCRIPTION OF THE DRAWINGS

Figure 1:
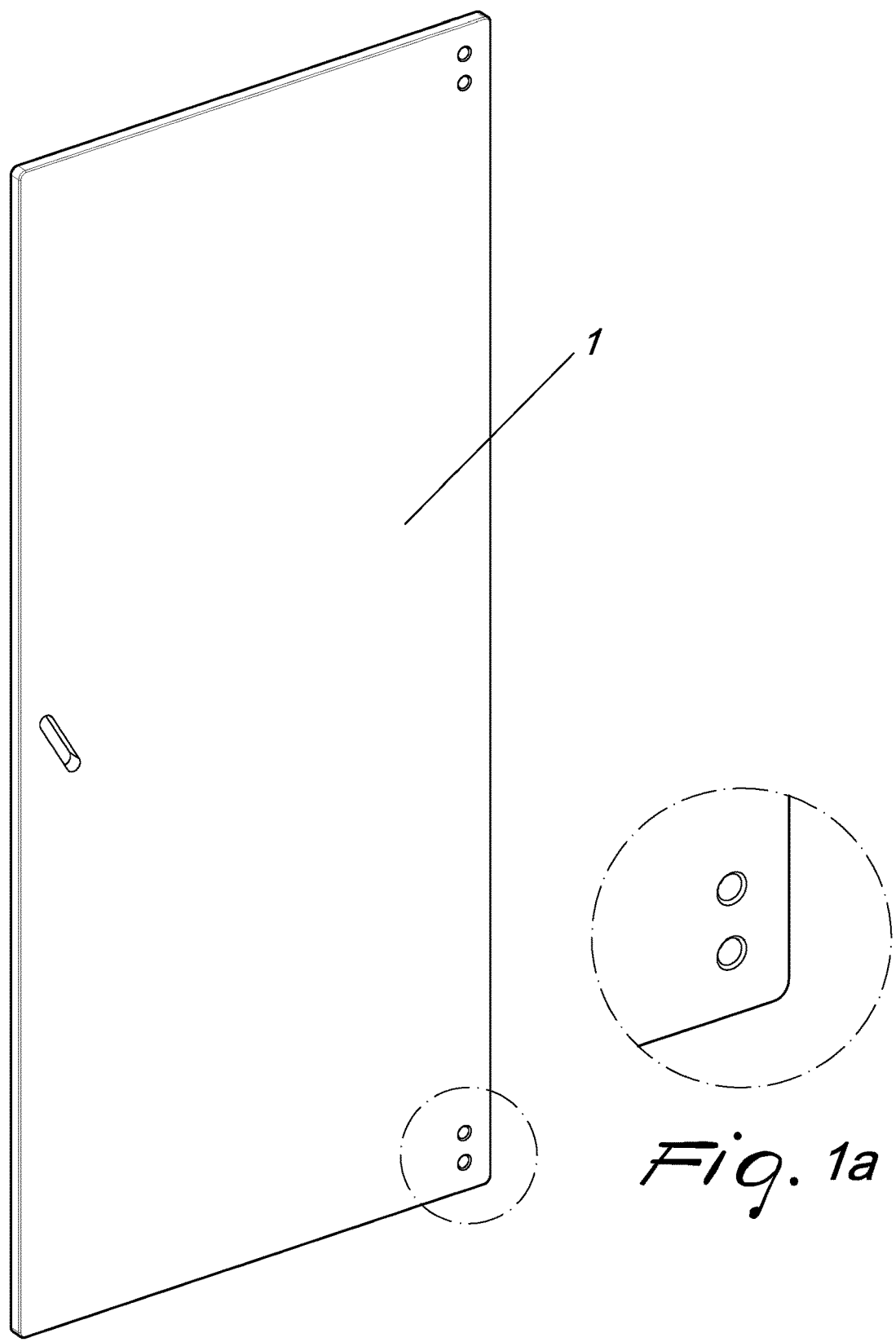
FIG. 1 is a view of an example of the finished product: a glass sheet ground at its perimetric edge by means of a method and a machine arranged upstream of the subject matter of the present disclosure and drilled and milled by means of the method and machine according to the present disclosure; this example represents the case of a glass door provided with two plus two holes for the fixing of the hinges and with a particular milling for interfacing with a particular handle/lock; holes and millings even of a complex type performed easily and automatically by the disclosure; the representations of the holes and milling are shown more evidently in the enlarged-scale details.

FIG. 1 and what has been anticipated in the introduction clearly show first of all that the three types of work: perimetric grinding, drilling and milling, in the combinations perimetric grinding and drilling or perimetric grinding and milling or perimetric grinding and drilling and milling, are essential for various requirements of use of the glass sheets. The solution adopted by the present disclosure, i.e., performing perimetric grinding in a first machine, which is not described here since it is well-known background art, and drilling and milling in a second machine, so as to constitute a transfer system, which is advantageous in terms of flexibility (FMS=Flexible Manufacturing System) and productivity, does not preclude the solution of performing all work in a combined machine, which likewise is not described here as another embodiment since it is not deemed inventive but simply a combination of two machines (a known one and an inventive one) into one and therefore unworthy of protection.

With reference to the accompanying figures, numerals with a single digit (optionally paired with a letter or an index for repetitive elements) designate the parts related to the glass sheet, while the details and constructive mechanisms are designated with three-digit numerals, the first digit of which, when paired with two zeros, is the digit of the main group to which it belongs, and four-digit numerals indicate the machines that constitute the complete automatic line for working the glass sheet (1000 the one according to the present disclosure, 2000 a grinding unit, 3000 a washing unit).

Identifications that use an UPPERCASE letter and a numeral relate to the axes along which the steps of work occur (feeding or adjustment).

In particular, the numeral 1 designates the glass sheet, the sides of which are designated respectively (in the case of a rectangular shape): the front side 1a, the lower longitudinal side 1b and the upper longitudinal side 1c, and the rear side 1d (with reference to the arrangement of the glass sheet 1 in the machine). The adjectives "front" and "rear", in this case, refer to the direction of motion of the glass sheet in the machine (from right to left in the representations of the figures). The faces of the glass sheet 1 are identified respectively by a1, for the one directed toward the operator, and p1, for the opposite one.

Figure 2:
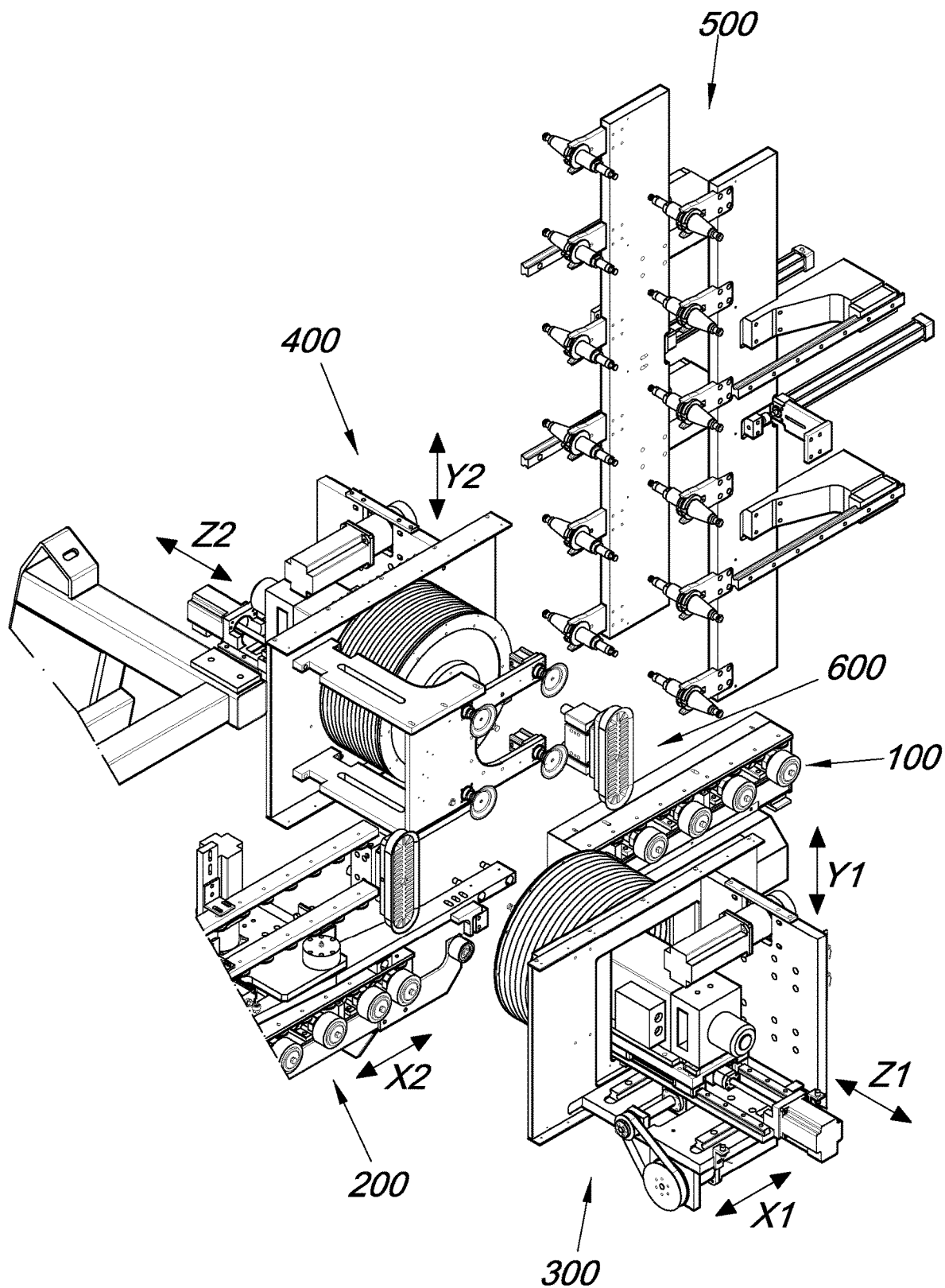
FIG. 2 summarizes the entirety of the disclosure, since it shows all the axes Y1, Y2, Z1, Z2, X1, X2 (the order presented here is easily for the subsequent description of a way of carrying out the disclosure), the actuation of which, interleaved as in the cases of Y1 with Y2 and Z1 with Z2 (for holes) and Y1 with Y2 and with X1 (for millings), allows the processes, for example the ones of FIG. 1 or even more complex ones, as well as simpler ones. The same figure also designates with numerals the main assemblies into which the machine is divided. This inventive core is summarized with the one shown by FIGS. 3 and 8.

With reference to FIG. 2, the machine according to the preferred embodiment comprises all the mechatronics mechanisms, individually belonging to known methods but providing in the combination an innovative machine and work method, adapted to respectively produce the following motions: Y1 and Y2, vertical synchronous movements of the front and rear working heads (for feeding or adjustment); Z1 and Z2, transverse synchronous movements with respect to the glass sheet 1 of the front and rear working heads (for feeding or adjustments); X1 longitudinal horizontal synchronous movement of the front working head (for feeding); X2 synchronous longitudinal horizontal movement of the reference for the placement (adjustment) of the glass sheet 1, i.e., for setting the initial position of each work on the part of the front and rear tools.

The machine dedicated to drilling and milling work is substantially constituted by an input conveyor, a main body and an output conveyor.

The input conveyor 100 comprises a motorized roller conveyor 101 for supporting the lower edge 1b of the glass sheet, on which there is a series of motorized support and conveyance rollers 102. The conveyor comprises further a resting surface 103, on which the glass sheet 1 is rested substantially vertically, in the sense described earlier, provided with idle wheels 104. This conveyor comprises a thickness detector 105 of a known type, for measuring the thickness of the glass sheet to be worked before it enters the drilling and milling section, this information being required in order to provide a signal for adjustment, along the axis Z1, of the abrasive tool of the front working head 300 with respect to the face on the operator side of the glass sheet 1, or alternatively being able to arrive as an output signal of the machines arranged upstream, and further comprises a sensor 106 for detecting the presence of the glass sheet in the loading area.

The conveyor is interfaced with any machines arranged upstream, for example the machine 2000 that performs the perimetric grinding work.

The output conveyor 200, which is constituted likewise by a motorized roller conveyor 201 provided with rollers 202, a resting surface 203 provided with idle wheels 204, is instead interfaced with any machines arranged downstream, for example the machine 3000 that performs the washing process. The same conveyor comprises a carriage that actuates the synchronous axis X2 that moves the reference for the placement of the glass sheet 1 in the longitudinal direction with respect to the bridges and working heads 300, 400.

Moreover, the output conveyor 200 comprises a sensor 205 for stopping the glass sheet 1 at the end of the machine or for interface clearance with the downstream machine 3000 that must perform the subsequent work.

Both conveyors, as well as the central machine body, keep the glass sheet at an inclination of approximately 6° with respect to the vertical, in order to provide the already described conditions of stability thereof during transport, parking and work.

The conveyors and the related actuation devices are extensively known and therefore are not discussed here in greater detail.

Between the two conveyors there is the main body of the machine, which contains: the front working head 300, the rear working and sheet fixing head 400, which move in a vertical direction, respectively Y1 and Y2, along vertical bridges of a known type; the tool magazine 500; a system of retractable suckers 600 that are fixed with respect to the structure of the machine.

Figure 4:
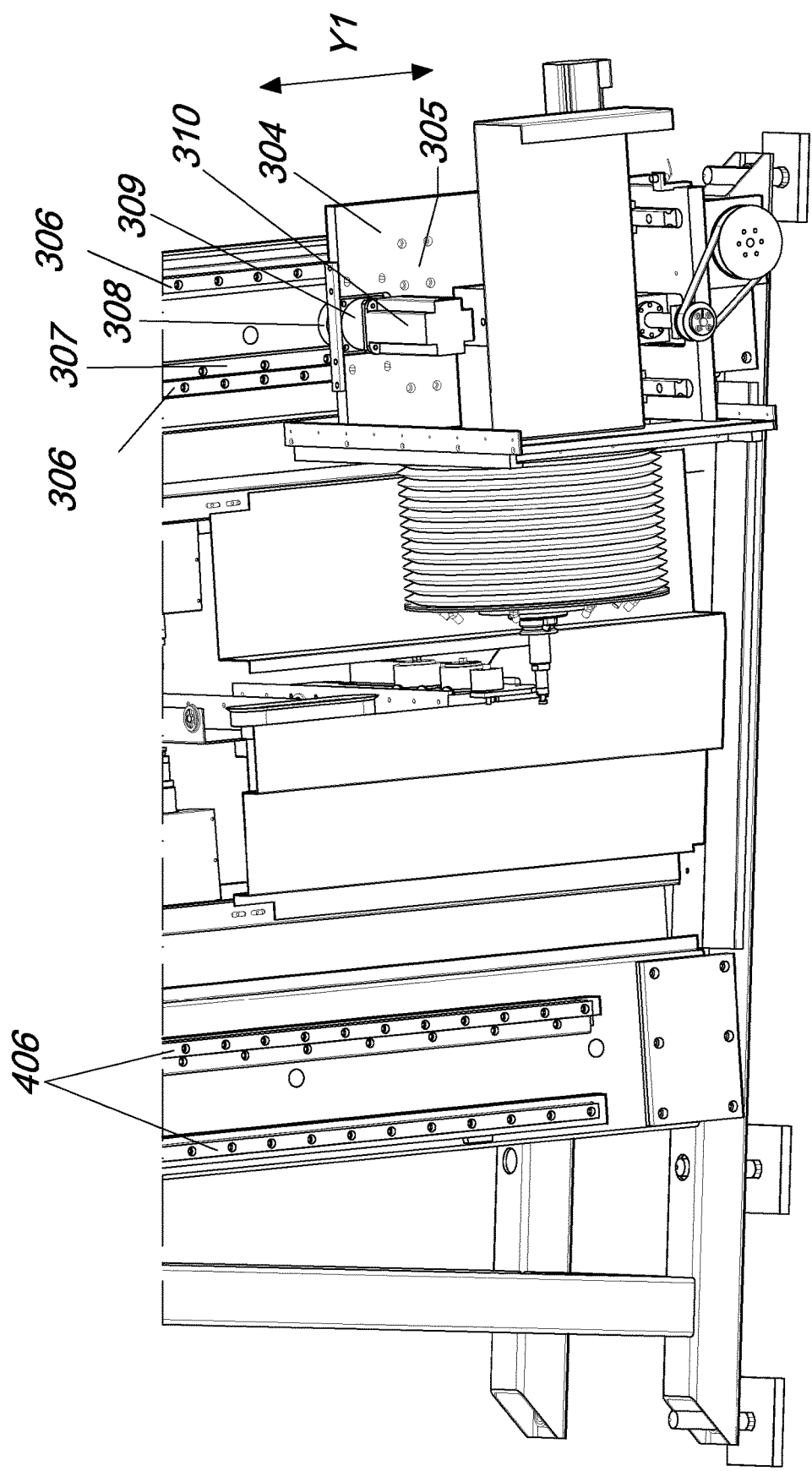
FIG. 4 is a view of the mechanisms for the actuation of the synchronous axis Y1, constituted substantially by: synchronous motor, reduction unit, pinion, rack, sliders and guides and corresponding supporting structures.
Figure 5:
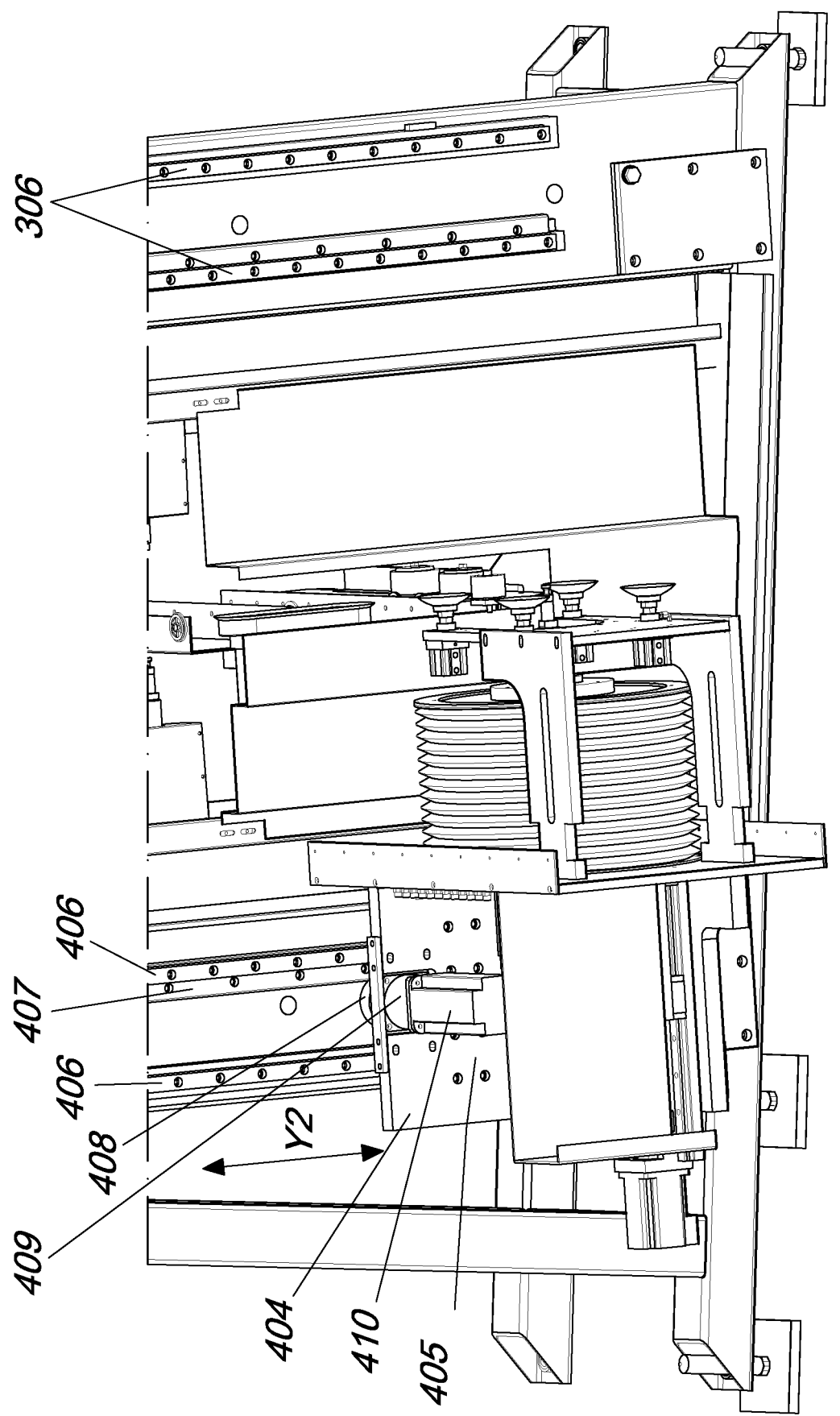
FIG. 5 is a view of the mechanisms for the actuation of the synchronous axis Y2, constituted substantially by: synchronous motor, reduction unit, pinion, rack, sliders and guides and corresponding supporting structures.
Figure 6:
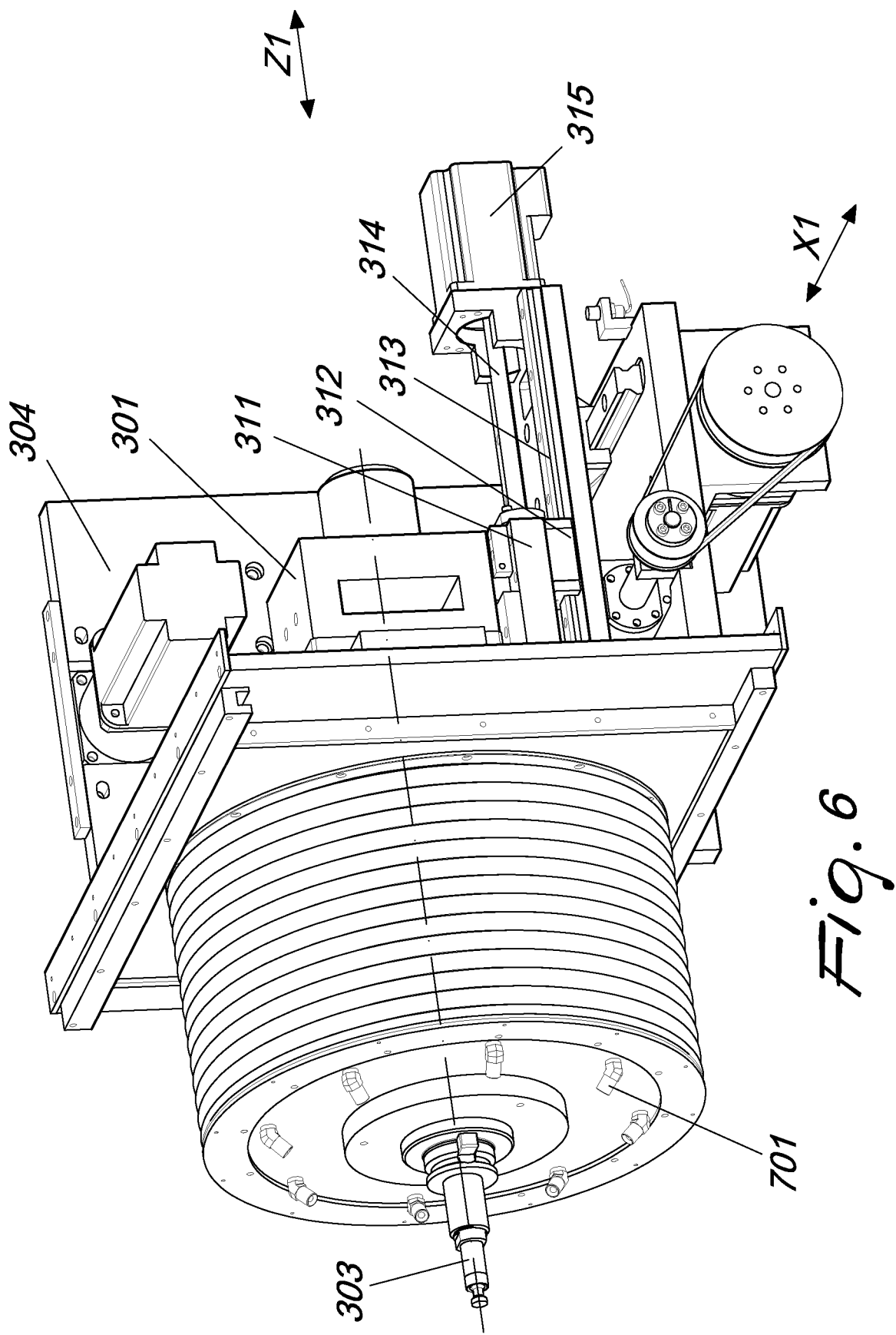
FIG. 6 is a view of the mechanisms for the actuation of the synchronous axis Z1, constituted substantially by: synchronous motor, ballscrew, sliders and guides and corresponding supporting structures; moreover, the mechanisms for the actuation of the synchronous axis X1 are present therein and are constituted substantially by: synchronous motor, optional reduction unit, belt transmission, ballscrew, sliders and guides and corresponding supporting structures, numbered however in the subsequent FIG. 8.
Figure 7:
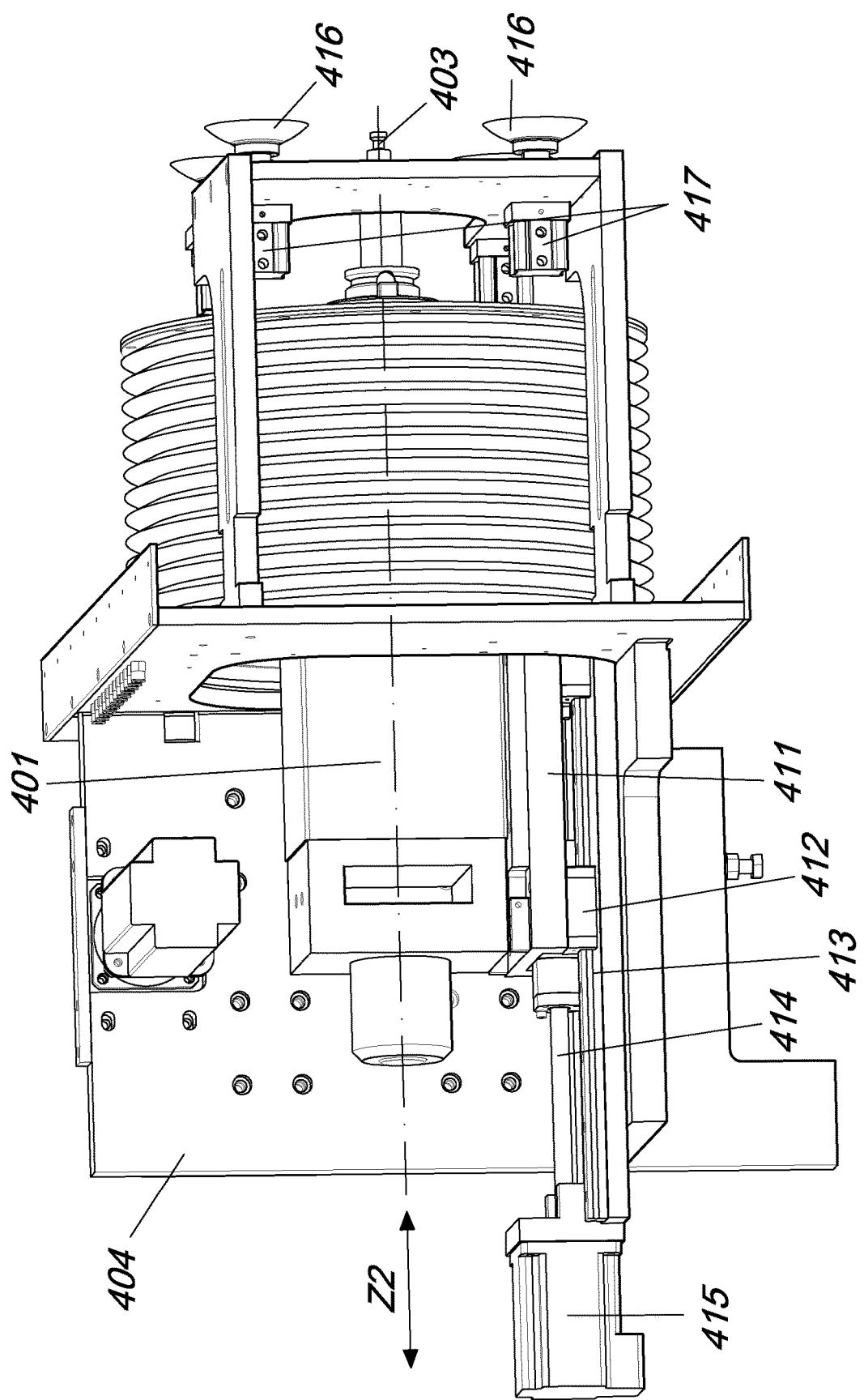
FIG. 7 is a view of the mechanisms for the actuation of the synchronous axis Z2, constituted substantially by: synchronous motor, ballscrew, sliders and guides and corresponding supporting structures.
Figure 8:
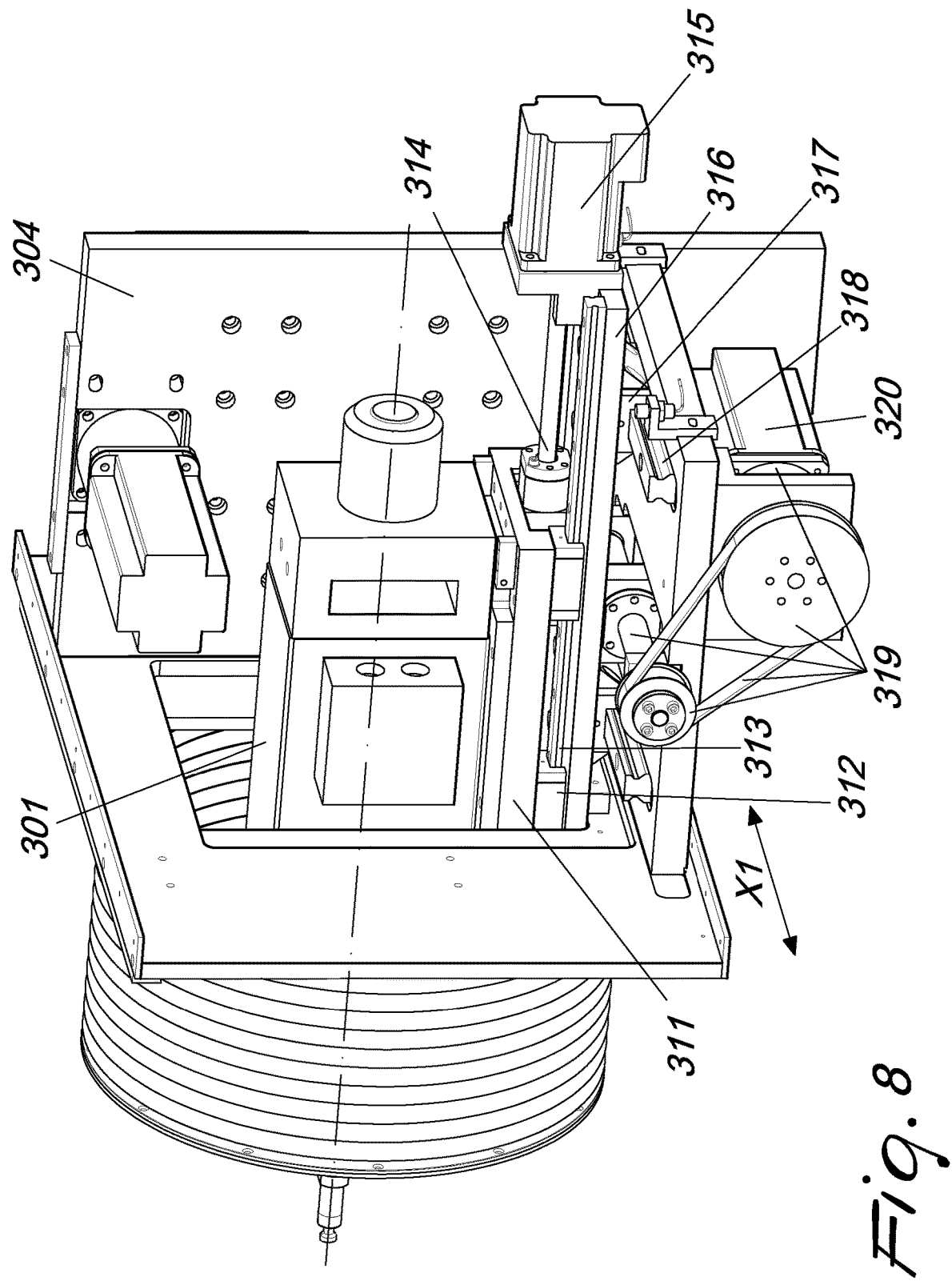
FIG. 8 shows, in a perspective view that is different from that of FIG. 6 and more completely, the mechanisms for the actuation of the synchronous axis X1, constituted substantially by: synchronous motor, optional reduction unit, belt transmission, ballscrew, sliders and guides and corresponding supporting structures; these mechanisms, together with the mechanisms that control the axis Y1 in the feeding function (term defined earlier) and with the mechanisms that control the axis Y2 in the adjustment function (term defined earlier) of the fixing means of the glass sheet, constitutes the new and inventive step with respect to the background art.

Respectively, the front working head 300 and the rear working head 400 are constituted in summary as follows. As regards the parts that have a common shape and process: an electric spindle 301, 401, with an axis that is transverse with respect to the face of the glass sheet, provided with the toolholder 302, 402, which in turn is associated with a tool 303, 403 that can be selected among n tool holders+tools, such electric spindle being integral with a slider 304, 404 that runs along the vertical axis Y1, Y2 by means of sliders 305, 405, guides 306, 406 and a mechanical transmission constituted by a rack 307, 407 and a pinion 308, 408, the latter being actuated by means of a reduction unit 309, 409 by a synchronous motor 310, 410 (see FIGS. 4, 5 and 12). Moreover, to the extent that is common to the two working heads 300, 400, between the electric spindle 301, 401 and the slider 304, 404 an additional slider 311, 411 is interposed which runs along the axis Z1, Z2 that is transverse to the face of the glass sheet by means of sliders 312, 412, guides 313, 413, and a mechanical transmission 314, 414 of the type of a screw and ball bearing nut, actuated by a synchronous motor 315, 415 (see FIGS. 6, 7). As regards the parts that have a different shape and process, the combination of which is in any case the inventive part of the disclosure that will be claimed, the front head 300 contains an additional exclusive movement along the longitudinal horizontal axis X1 performed by means of an adapted slider 316 (interposed between the similar sliders 304 and 311) that runs along said axis X1 by means of sliders 317, guides 318 and a mechanical transmission 319 constituted by a screw and a ball bearing nut, pulleys and belt and optional reduction unit, actuated by a synchronous motor 320 (see FIG. 8).

Figure 3:
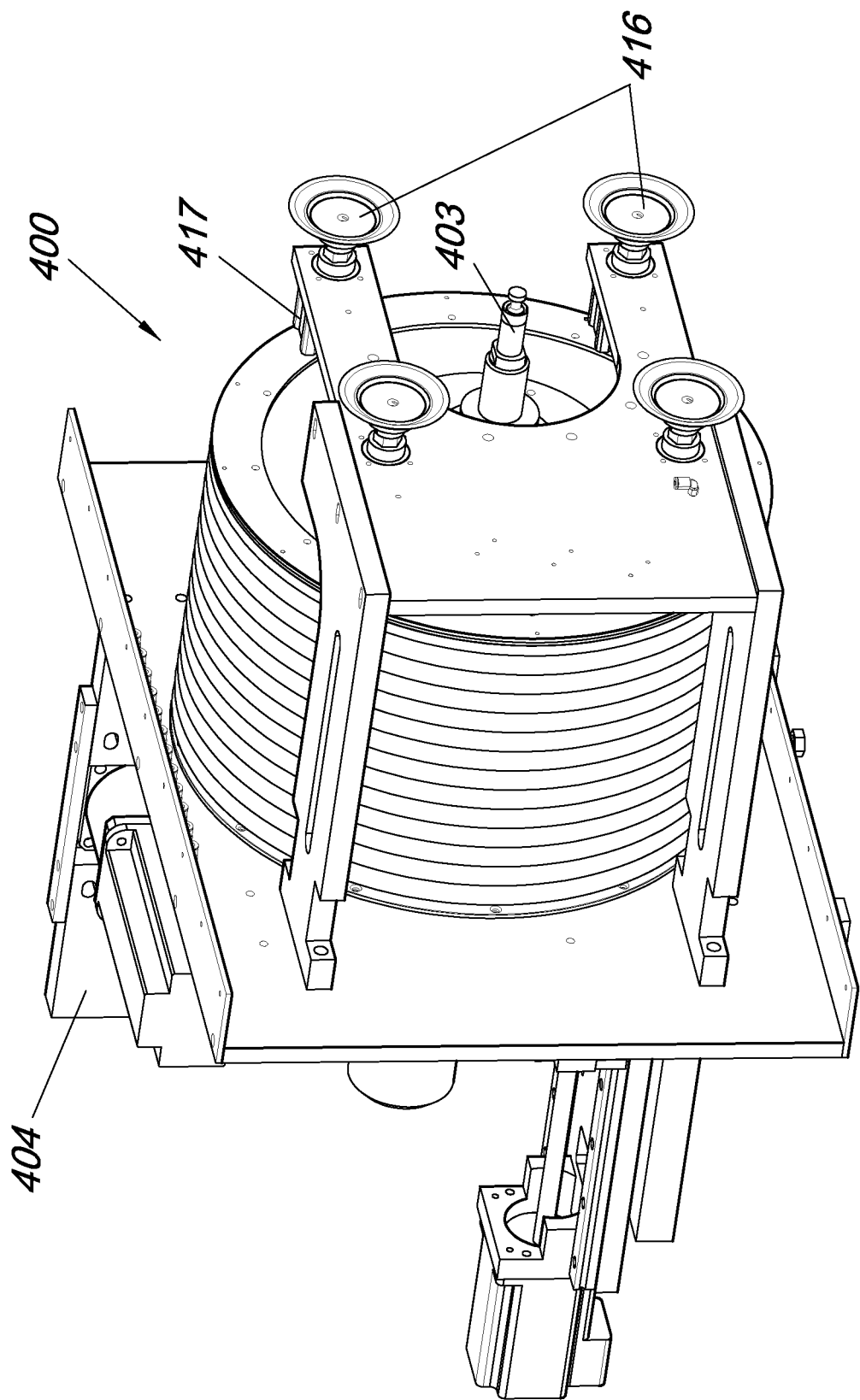
FIG. 3 contains the inventive core of the disclosure, i.e., the complementary function of the rear working head used to position the means for fixing the glass sheet proximate to the portion intended for work, both drilling and milling; said fixing means being constituted by suckers, four being shown in the figure, but the quantity can be greater or smaller.

Moving on to the rear working head 400, the corresponding exclusive part (see FIG. 3) comprises a set of suckers 416 (the quantity being optionally from 1 to m) arranged in an array and integral with the slider 404, which therefore benefits from the movement along the vertical axis Y2 of the rear working head 400 to arrange itself, peripherally (symmetrically) with respect to the tool 403 and peripherally (symmetrically) or laterally (vertically offset and therefore not symmetrically) with respect to the tool 303 during the work for drilling and milling the glass sheet 1. Such suckers interact with the rear face p1 of the glass sheet 1 or move away from it by means of a movement that is actuated for example by individual pneumatic actuators 417 depending on the condition of the operating cycle of the machine, which is described hereinafter.

Figure 21:
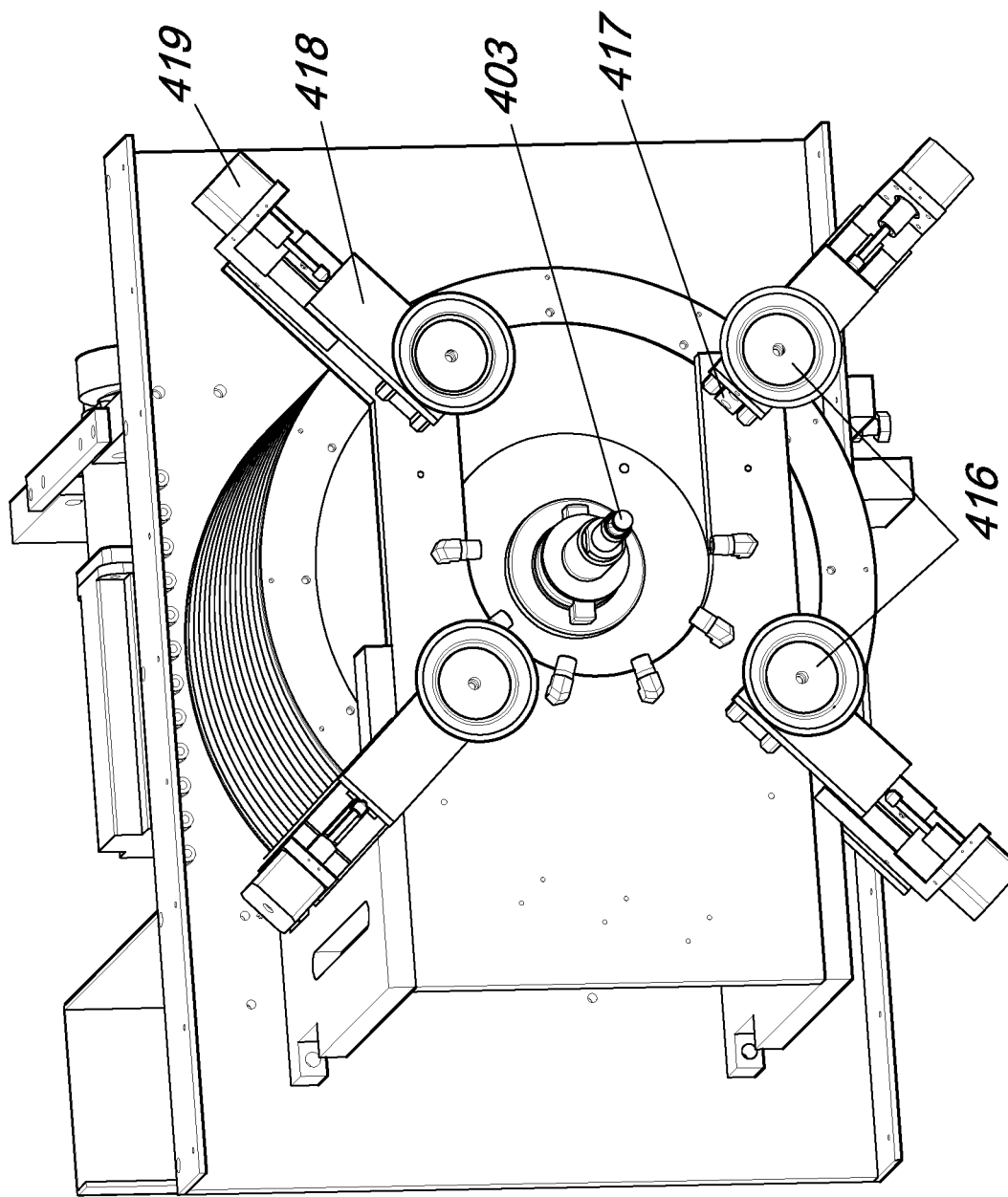
FIG. 21 is a view of a possible version of adjustability of the (at least one) suckers on the plane that is parallel to the plane of the glass sheet, this adjustability being obtained by means of sliders and actuators.

An important option (see FIG. 21), which is being claimed, is constituted by the adjustability of the position of the suckers 416 (it being always understood that it is at least one sucker) in their own plane of arrangement that is parallel to the glass sheet (which coincides with a plane that is proximate to the rear face p1 thereof during the adjustment step). This adjustment can be performed by means of sliders 418 and actuators 419, for example arranged radially as shown in FIG. 21. This adjustability can be used usefully, both to optimize the field of action of the suckers in the function for fixing the glass sheet and for the possible placement of one or more of them at the work waste in order to retain it and subsequently guide it, by means of the synchronous axis Y2 according to FIG. 5, to the lower position suitable for release, for example at chutes or conveyor belts. FIG. 21 is a view of a possible simple configuration of the placeability of the suckers, but different configurations can be configured in order to interact with the waste as a function of the type of work. Software that receives as INPUT the format of the glass sheet 1 and the type of work (for example the ones of FIG. 19a or of FIG. 19b) provides the information to the PLC (Programmable Logic Controller), which processes the OUTPUTs for the placement of the suckers 416 in the plane p1 by means of the actuators 419 and the coupling or uncoupling of the suckers 416 with respect to the plane p1, at the portion of the glass sheet 1 that will be converted into waste as a consequence of work.

Figure 11:
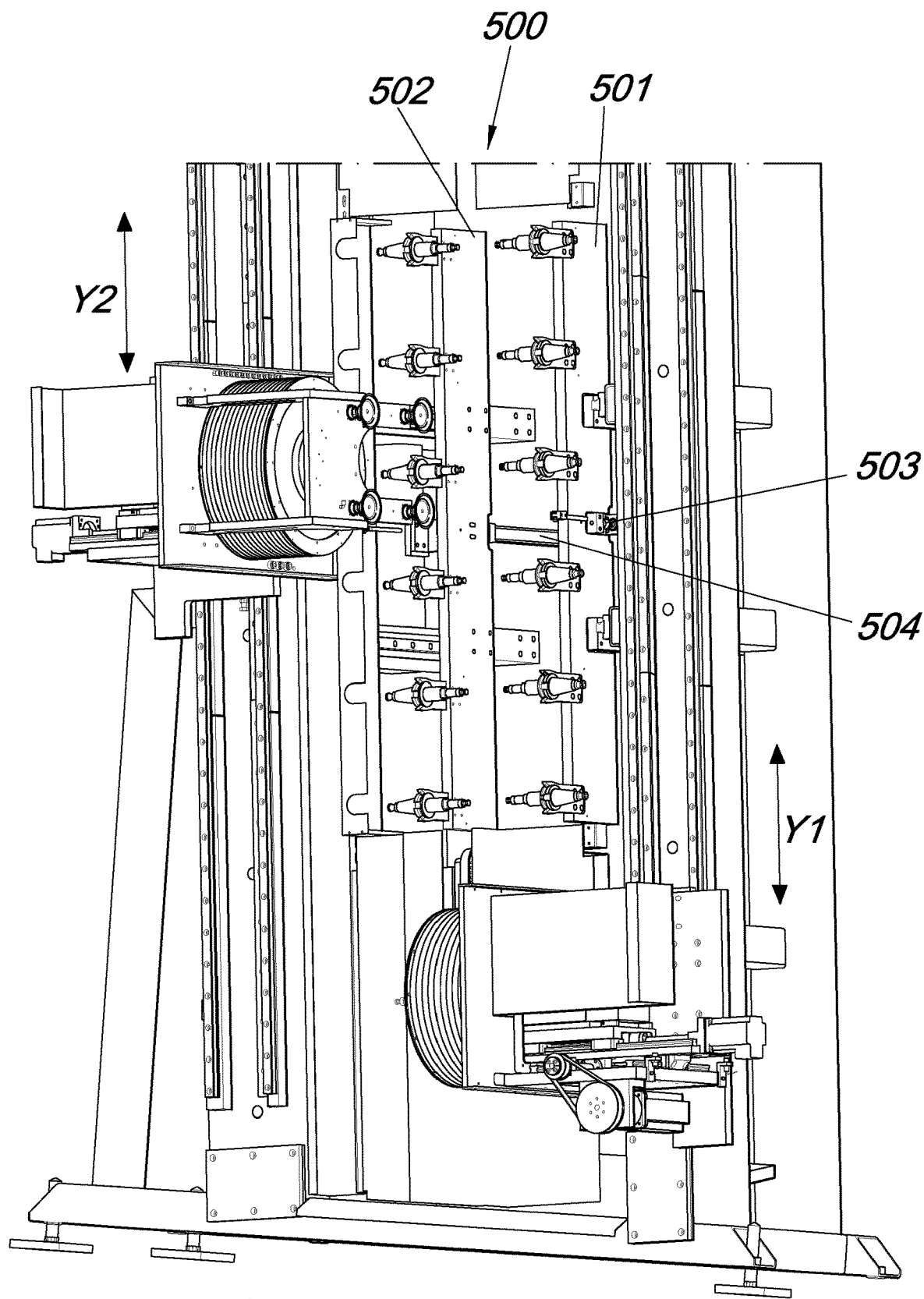
FIG. 11 shows the tool magazines toward which the front and rear work heads, by using the axes Y1 and Y2, interface in order to deposit the tools used in the preceding work in order to pick up the tools intended for the subsequent work. The condition of extension of the rear tool supporting rack and of picking up a tool on the part of the rear work head is shown.

The tool magazine 500 also belongs to the central body and is split into a front row 501 and a rear row 502 of the rack type, the operation of which belongs to the background art and simply includes the arrangement of each rack in the work area of the heads for example by means of pneumatic actuators 503 504, in order to interface with the axis of the electric spindle or in the step of retracting the toolholder that ended work or in the step of delivering the toolholder required for the subsequent work (see FIG. 11).

As regards the system of retractable suckers of the series 600, the drawings show a solution with two suckers of the type 601, 603, which by means of known pneumatic actuators 602, 604, of the slider type, couple to the rear face p1 of the glass sheet 1 or move away from it, depending on the condition of the operating cycle of the machine described hereinafter. Such suckers having a large surface, together with the suckers 416 arranged on the movable rear head 400 having a smaller surface, retain the glass sheet 1 during work, adequately contrasting the stresses produced by the cutting and feeding (or advancement) motion of the tools, the glass sheet 1 being fixed in multiple positions and therefore locked against translations and rotations.

Figure 9:
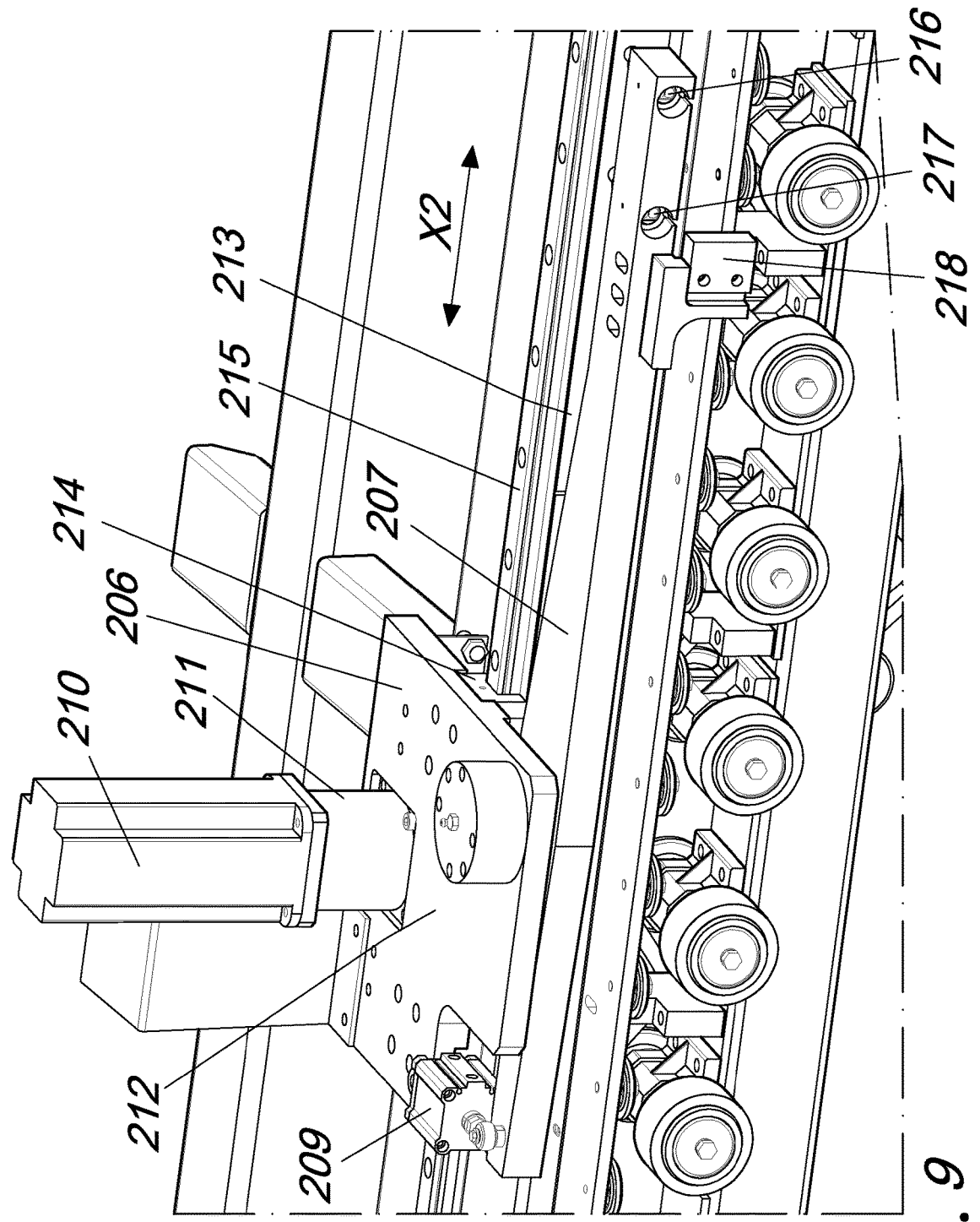
FIG. 9 shows the mechanisms for the actuation of the synchronous axis X2, which are constituted substantially by synchronous motor, reduction unit, pinion, rack, sliders and guides and corresponding supporting structures; this axis is not active in the process for working the glass sheet, but is actuated in advance for precise placement in a horizontal direction of the glass sheet, performed by the input and output conveyors, so that the portion to be drilled or milled is adjusted (term defined earlier) with a precise timing with respect to the tools that perform the cutting motion.

To complete the description of the output conveyor 200, the mechanisms that actuate the movement of the carriage that actuates the synchronous axis X2 are described finally here in order to highlight the inventive step with respect to the background art CN 203187555 (U), the latter referencing a carriage (designated by the numeral 1 in FIG. 1 of the Chinese patent), the function of which is to fix the rear edge 1d of the glass sheet 1 by means of a system of clamps in order to move it synchronously not only in the positioning (adjustment) step but also in the work step, even supplying the feeding (or advancement) motion for the milling work that has a horizontal orientation or has a horizontal component. The axis X2 of the present disclosure instead arranges a device that interacts with the front edge 1a of the glass sheet 1 for its reference stop, with precise placement since it is actuated by a synchronous motor 210, such placement being performed in order to adjust the region of the glass sheet with a precise phase with respect to the work tool, but the feeding motions that are horizontal or have a horizontal component are actuated exclusively by the tool 301, while the glass sheet 1 remains locked with respect to the slider 404 by means of the suckers 416 (in a quantity from 1 to m) and by means of the suckers 601, 603 (in a quantity typically from 1 to 2 or more). The mechatronic components for performing the above are constituted by the carriage 206, provided with an arm 207 that is pivoted on an axis and oscillates by way of the action of the actuator 209. Such carriage is moved along the axis X2 by the synchronous motor 210 by means of the reduction unit 211 the pinion 212 (not visible but shown in FIG. 9) coupled to the rack 213 (partially visible but indicated in FIG. 9) and guided by means of the sliders 214 along the guide 215. The carriage 206 is provided with means, for example suckers or clamps as schematically shown in FIG. 23, for coupling to the glass sheet 1.

The arm 207 is oriented in the active state so that the sensors 216 and 217 actuate the speed changes (or also the halting) of the roller conveyor 201 and the block 218 constitutes the mechanical stop for the side 1a of the glass sheet 1 and optionally by means of a microswitch actuates the halting of the roller conveyor 201. The same arm is oriented in the inactive state in order to allow the passage of the working heads 300 and 400 and the transit of the glass sheet 1 at the end of the work along the output conveyor 200. Such orientations are shown in FIGS. 10a and 10b.

Figure 15:
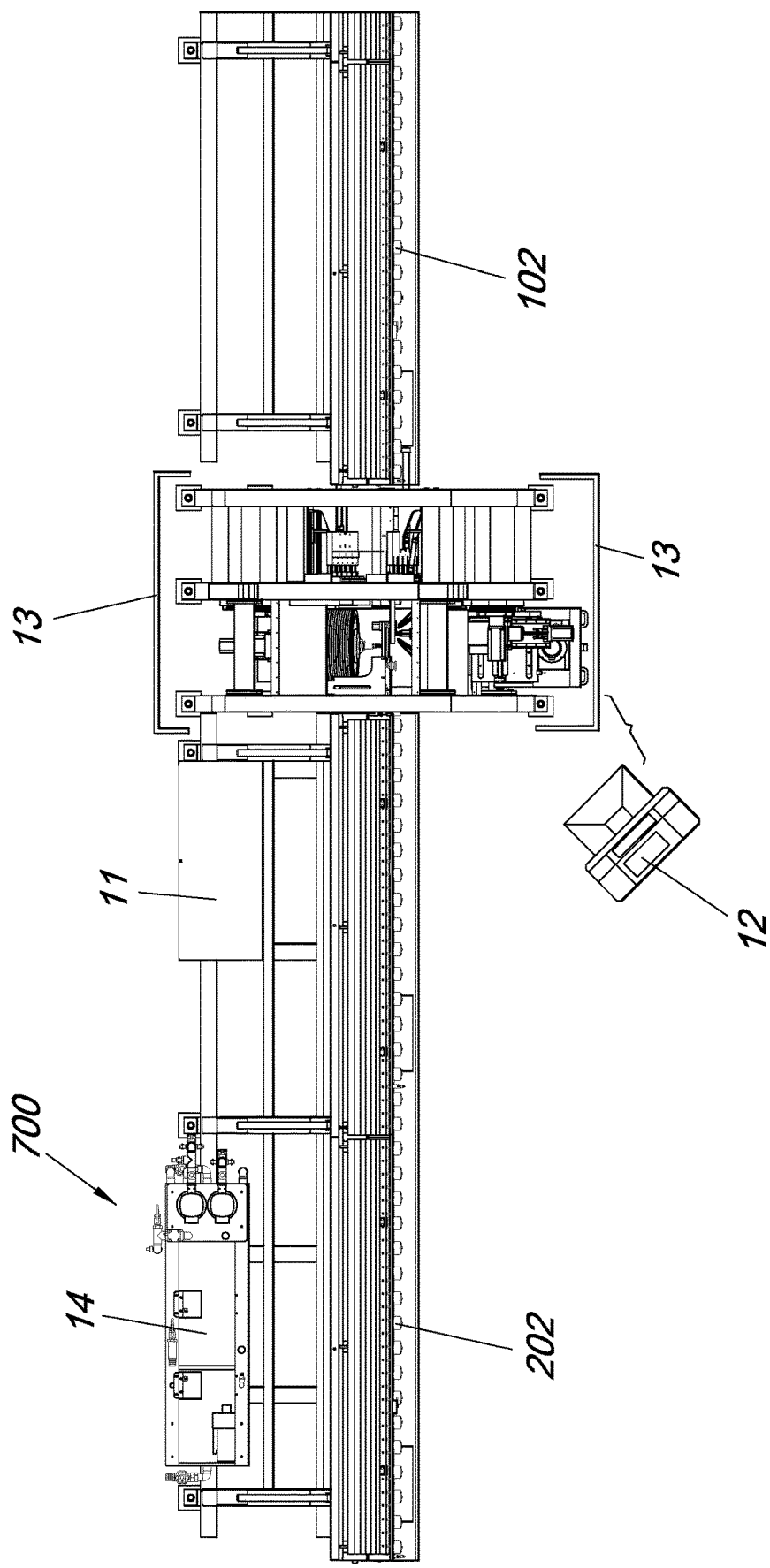
FIG. 15 is a schematic plan view of the entirety of the machine with the indication: of the electrical/electronic control panel, of the operator interface post, of the safety devices, of the control unit for circulating the cooling and lubrication fluid, with furthermore the indication of some details that are not visible in the remaining figures.

A section 700, shown only schematically in FIG. 15 since it is known, comprises a hydraulic pump, which draws water from a recirculation tank and accessories such as filters, valves, etc. in order to direct a stream of water toward the nozzles 701, 702 for cooling and lubrication of the tools 303, 403. This circuit is obviously provided with a filter, with valves and other known accessories.

Now, we move on to the description of the work cycle as performed on the glass sheet 1 by interaction of the various mechatronic components described earlier, in order to obtain a milling having an open shape, for example on the vertical front side 1a of the glass sheet 1, by means of the tool 303 of the front working head 300.

Figure 18:
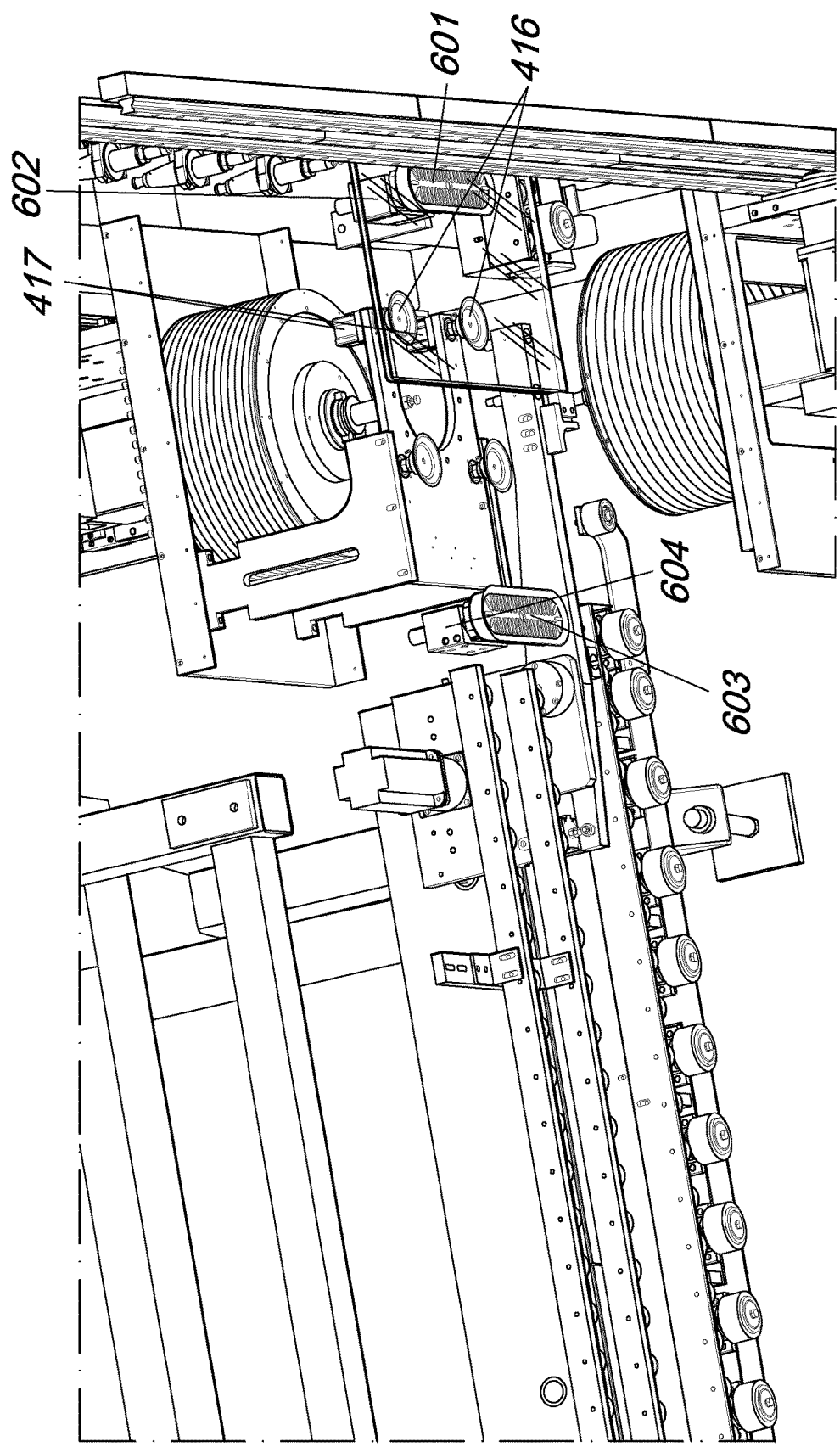

The glass sheet 1 that arrives from the preceding work machine of the type 2000 (or loaded manually or by means of a magazine on the input conveyor 100 of the machine 1000) is made to advance, conveyed by the support and conveyance rollers 102 of the conveyor 101 and rested on the series of wheels 104, until it stops at the stop foot (pad) 218 after speed reductions activated by the sensors 216, 217, such foot having been pre-positioned, by means of the carriage 206 that runs along the longitudinal axis X2 of the output conveyor 200 as a function of the work to be performed on the glass sheet 1 and oriented in an active position, by means of the actuator 209, as a consequence of the information transferred from the production management system to the process PLC of the machine (by means of a keyboard, USB, net, scanner, etc.). This is the condition shown in FIG. 18, in which the glass sheet 1 is in the conditions in which it can be as mentioned milled at the front side 1a.

At this point the carriage 206 that bears the arm 207 performs a spacing stroke in order to free the field of action of the front and rear working heads; the rear working head 400, by means of the adjustment motion along the axis Y2, arranges itself at the height (an operation that could also have been performed earlier in coordination with the cycle of the carriage 206) so as to move the set of suckers 416 into a position adapted to retain the flap of the glass sheet 1 as close as possible to the work area of the front tool 303; the suckers 416 that have a complete mating with the rear face p1 of the glass sheet 1 are coupled to such face by the actuators 417 and vacuum is activated in order to mutually retain the suckers and the glass sheet 1; this also occurs for the sucker 601, which has a larger retention capacity and is coupled to the rear face p1 of the glass sheet 1 by means of the actuator 602 and for which vacuum is activated as well. In this condition, shown in FIG. 19, it can be intuited that by means of a first adjustment motion of the front working head 300 along the axis Y1 (and optionally along the axis X1) the tool 303 arranges itself in the work start position (an operation that could also have been performed in advance in coordination with the cycle of the carriage 206). Likewise it is also possible to intuit that by acting therefore on the axes Z1 so that the tool 303 interferes with the entire thickness of the glass sheet 1, Y1 and X1 coordinated, it is possible to provide the work as shown in FIG. 19a.

If the work does not comprise the perimeter, as shown for example in FIG. 19b, the intervention of the milling unit constituted by the front head 300 is anticipated by an intervention of the drilling units constituted both by the front working head 300 and by the rear working head 400, in order to provide a through hole within which the milling unit of the front working head 300 will work subsequently. In order to provide such hole, both tools must work: the rear one 403, actuated with a feeding motion along the axis Z2 so as to affect the thickness partially, for example ⅓, the front one 303, subsequently, actuated with a feeding motion along the axis Z1 so as to affect the thickness partially, for example for the complementary value of ⅔ or rather slightly more in order to avoid effects of discontinuity at the border between the strokes of the two tools.

This occurs because if the drilling of the glass sheets occurred on a single face it would evidently entail in exiting through the opposite face.

Once such hole has been provided, in order to perform the milling of the desired shape, one proceeds as described previously for the case of milling that affects the margin of the glass sheet.

Figure 20:
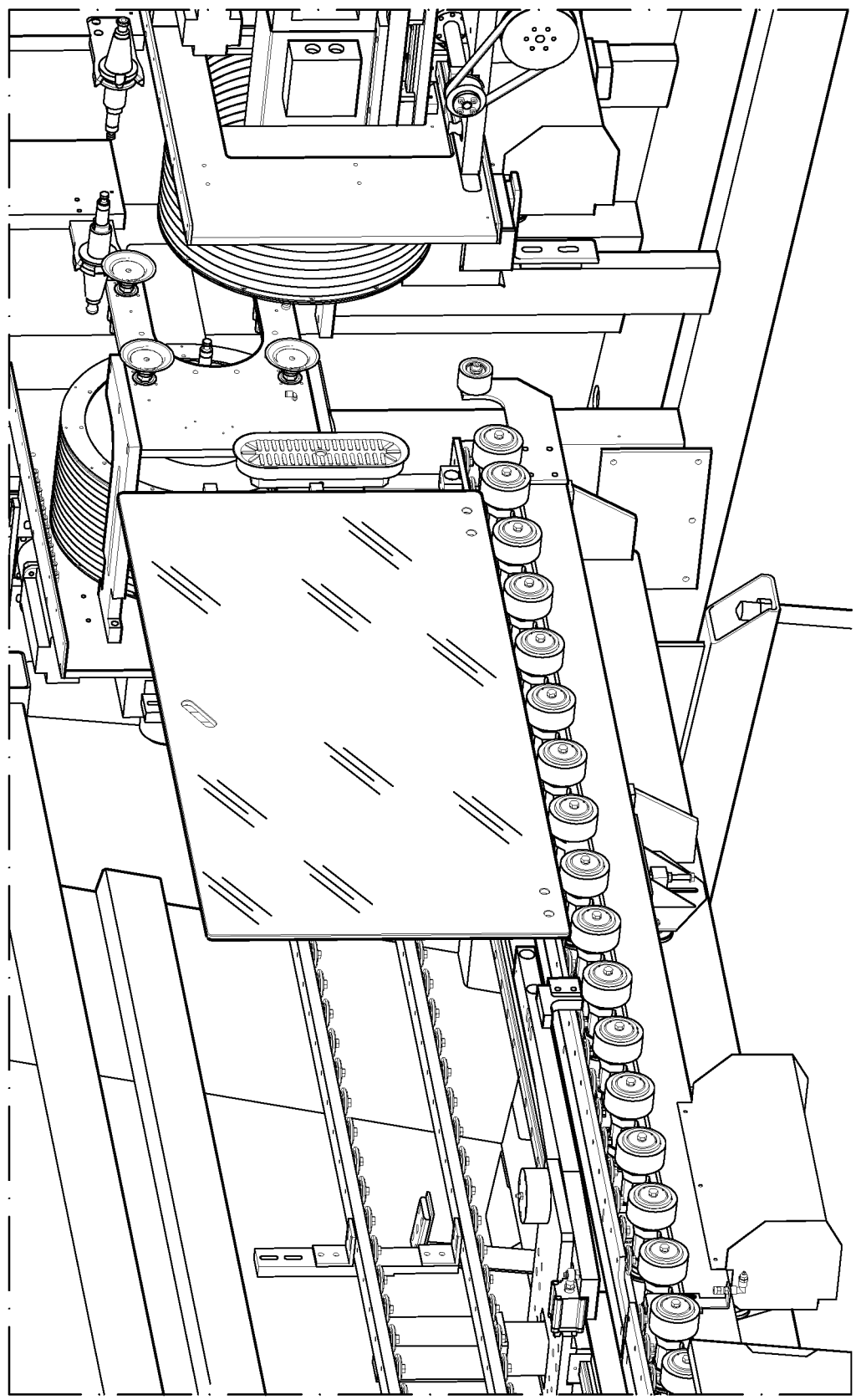

Once work, which can be multiple work in the same glass sheet 1, has ended, obviously by means of multiple reiterations of the cycle described earlier, comprising therein the placement of the carriage 206 for the progressive adjustment of the front flap 1a of the glass sheet 1, said sheet is evacuated by means of the action of the conveyors 100 and 200, as shown in FIG. 20.

Figure 12:
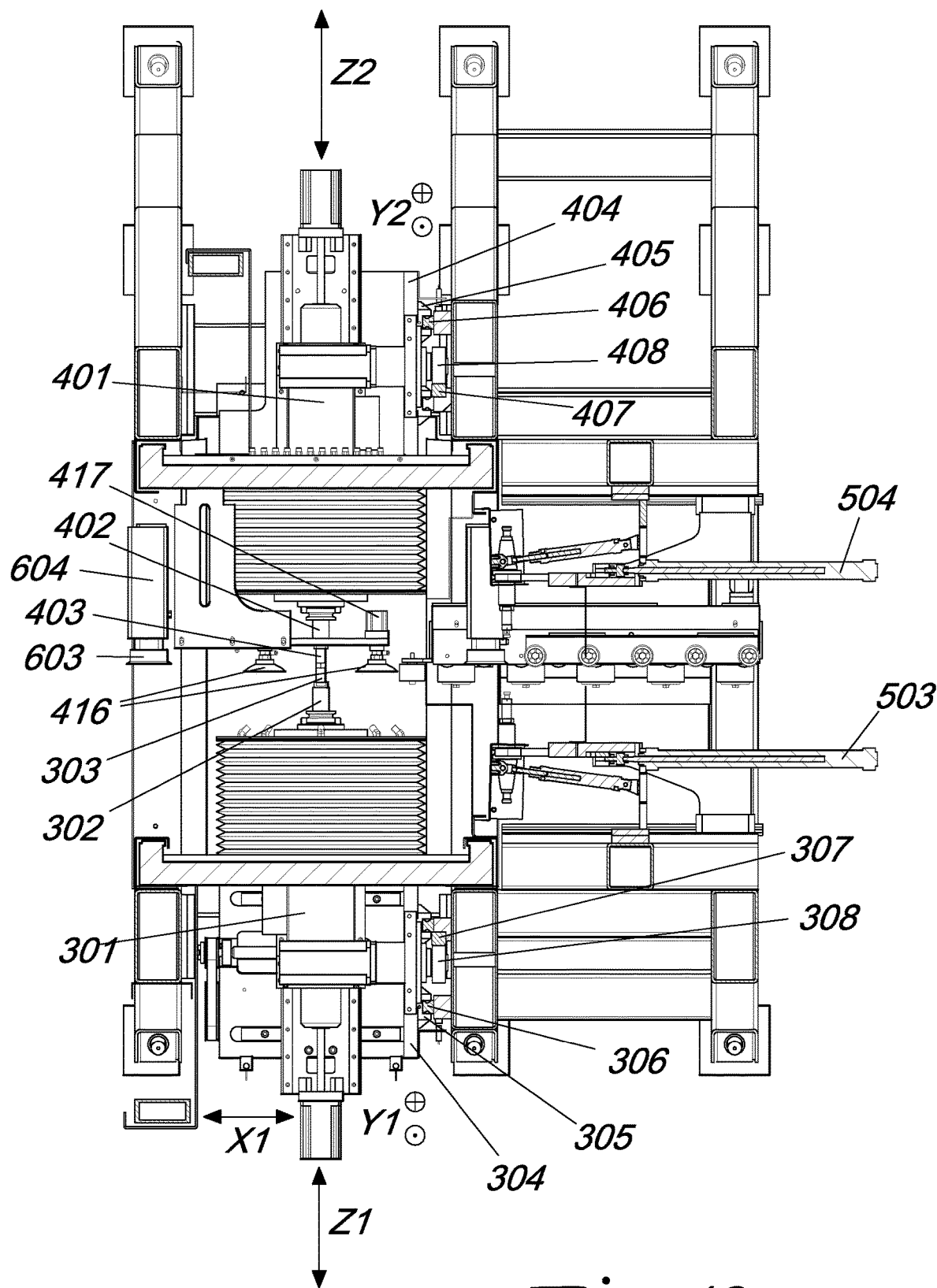
FIG. 12 shows, in a top view and simultaneously: the mechanisms that actuate the movements along the axes Y1, Y2, Z1, Z2, X1; the working heads; the means for fixing the glass sheet that belong to the rear working head; the electric spindles that impart the rotary (cutting) motion to the tools; a portion of the tool magazines.
Figure 14:
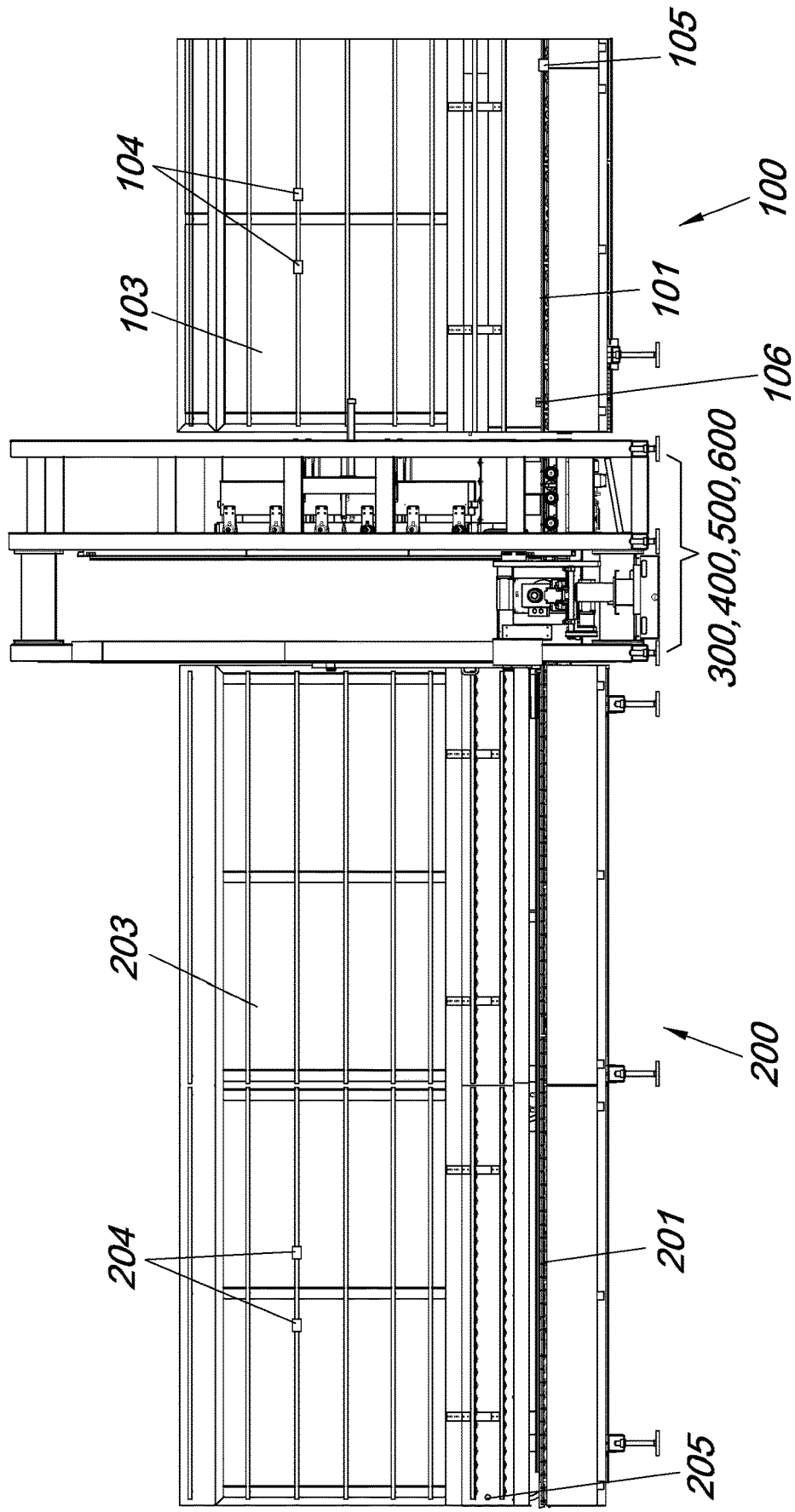
FIG. 14 is an elevation view of the overall structure of the machine that accommodates all the mechanisms described earlier, furthermore with the indication of some details that are not visible in the remaining figures.

The descriptive detail related to the cycle for picking up and returning the tools is omitted; it involves the operation of the axes Y1 and Y2 with the appearance/disappearance of the racks 501 and 502 of the tool magazine 500 by means of the actuators 503 and 504 and is intuitive from the viewing of FIGS. 11 and 12 and well established in the background art.

As regards the cutting motion, respectively the front tool 303 and the rear tool 403, accommodated in the tool holders 302 and 402 with quick coupling, which in turn are accommodated in the shafts of the electric spindles 301 and 401, power is supplied by asynchronous motors actuated by inverters in order to obtain a cutting speed that can vary as a function of the type of glass sheet in terms of material, thickness, presence of membranes made of PVB or EVA; type of tools in terms of material of the mix, material of the abrasive, shape and diameter; type of the cooling and lubrication fluid; feed (or advancement) rate.

Figure 17A:
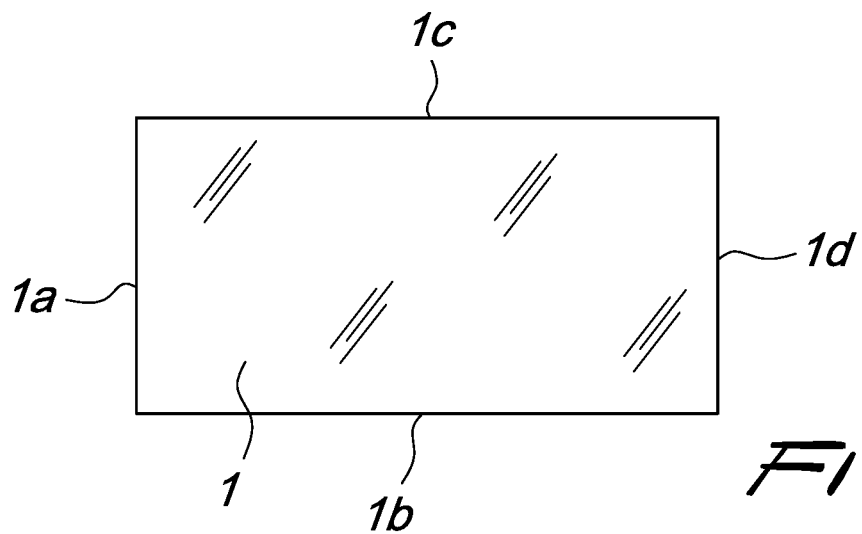
FIGS. 17a-17c show by way of non-exhaustive example the shapes of the glass sheets (rectangular, rectilinearly contoured and curvilinearly contoured) that can be worked with the machine and the method according to the present disclosure, as well as possible shapes of said work.
Figure 17B:
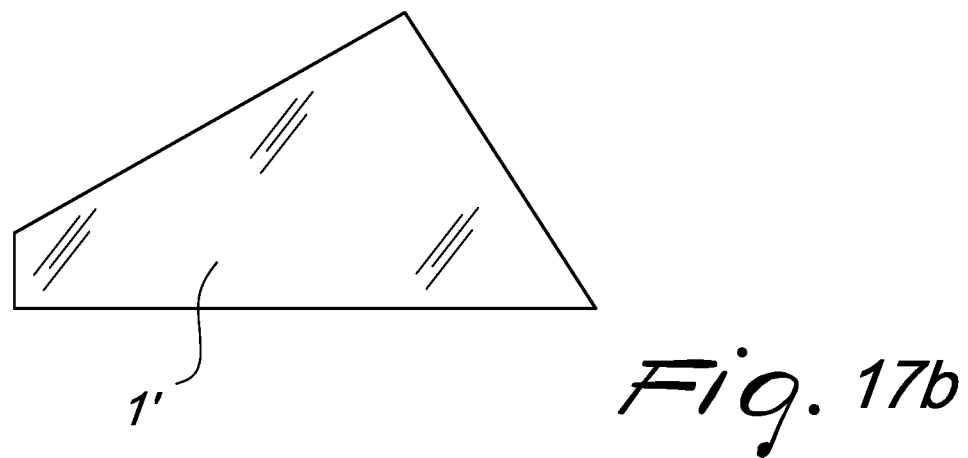
Figure 17C:
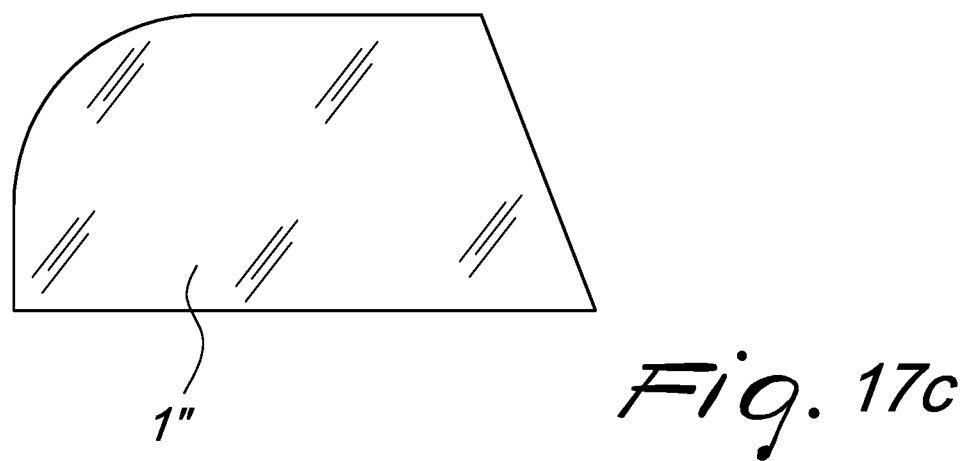

The glass sheets 1 can have a rectangular or other than rectangular shape (for example, viewing FIG. 17b, 1' contoured with all rectilinear portions and FIG. 17c, 1" contoured with part of the portions curvilinear). Software interfaced with the library of the shapes desired by the user interleaves the signal generated by the sensors 216, 217, 218, or equivalent devices arranged according to the shape of the glass sheet 1, so as to provide the input to the PLC (Programmable Logic Controller) suitable to stop the sheet 1 in a precise phase with respect to the working heads, since it can be controlled on the basis of the position of the carriage 206.

Conveniently, the tools 303 and 403 are adequately sprayed by a cooling/lubricant flow by means of a plurality of nozzles, respectively 701 and 702, as can be seen in the various figures.

The description given above relates to a machine in which the flow of the material to be worked (glass sheet 1) occurs from right to left, in particular with the sheet arriving from another machine (grinding machine 2000) arranged upstream (to the right) of the described machine and with the sheet destined for another machine (washing unit 3000) arranged downstream (to the left) of the described machine. It is easy to imagine the description and the associated figures in the case of a mirror-symmetrical arrangement or with the origin and destination related to other types of machines or both situations.

Obviously, all the movements linked to the steps of the cycle are mutually interlocked, by means of the aid of a parallel and always active logic system, in order to avoid, during the process, conditions of interference among actuation elements, tools and material being worked (glass sheet 1) that are different from the ones required for drilling and milling work that entail operating process interferences. This is done for the validity of the process, to preserve the integrity of the machine and for the safety of the operators, maintenance technicians and visitors.

It has thus been shown that the machine according to the disclosure achieves the intended aims and advantages. The disclosure is susceptible of numerous modifications and variations, all of which are within the scope of the same inventive concept. Thus, for example, the mechanical solutions for the motions for feeding, adjustment and cutting of the tools, the support and transport of the glass sheet and the actuation means, which can be electrical, electrical-electronic, pneumatic, hydraulic and/or combined, while the control means can be electronic or fluidic and/or combined.

Moreover, the tool 303 can have a profiled shape (complementary with the profile that one wishes to obtain through the thickness of the glass sheet 1, for example beveled at the surfaces a1 and p1).

Obviously, the spindles 301 and 401 can accommodate for this purpose interchangeable tools 303 and 403, which are used alternately not only to perform work with grinding wheels having different profiles but also different grits and mixes in order to obtain different finishes or progressively finer finishes.

Obviously the machine, by operating in a wet environment due to the cooling and lubricant flow directed onto the tools, is provided with protections such as bulkheads, sheaths, accordion-like portions, etc., in order to avoid the escape of fluids and the contamination of the parts that are not suitable to bear contact with liquids.

Furthermore, since the drilling and milling work entail the production of waste; not only constituted by classic glass dust produced by the grinding action performed by the tools 303, 403, but most of all constituted by actual flat pieces of glass sheet that correspond to the removed parts (complement of the openings provided minus the part converted into dust by the tools); the machine is provided with adapted chutes or mechanized devices (for example conveyor belts of the grid type) in order to remove said waste. This is in combination or not with the foregoing description regarding the adjustability of the suckers 416 and the possibility to use the axis Y2 in order to guide the work waste to a lower height.

Moreover, the work waste that derives from drilling, of the so-called core type, can be moved away by way of the action of the stream of cooling/lubrication water that is directed through the hollow part of the front tool 303 or, as an alternative, by way of the action of an air stream that also is directed through the hollow part of the front tool 303.

The constructive details can be replaced with other technically equivalent ones. The materials and dimensions can change according to the requirements, in particular arising from the dimensions (base, height, thickness) of the glass sheets 1.

In particular, the means for supporting and moving the glass sheet 1, besides the ones described, comprise all the equivalents, such as for example belts (as shown in FIG. 22) instead of rollers.

In particular, the means for positioning the glass sheets 1 can be coupled thereto by way of suckers or grippers.

Obviously the industrial application is assuredly successful, since in many applications not only the perimetric edge of the glass sheet must be worked, as already occurs according to multiple by now widespread known methods, but also portions of the surface of the glass sheet 1 require additional work, such as drilling and milling according to the description, work which also is by now widespread but by resorting to known methods, which are mediocre in terms of quality, since the region affected by drilling and/or milling is not adequately retained and optionally even insufficient in terms of productivity, since they are combined with the grinding work. Examples of requirements of this drilling and/or milling work are several and specifically for at least the following products: handrails, railings, steps, shelters, dividing walls and walkable areas (for which the evolution of the standards has led to a particular attention: as regards the fixing modes, which occur with work on the surface and affect the thickness of the sheet, both for drilling and for milling; as regards the type of such work. Such standards are UNI 7697/2014, which replaces UNI 7697/2007 ("Safety criteria in glassmaking applications"). Moreover, the market of glass for enclosures of buildings and of insulating glass used in continuous faces and in structural faces is expanding continuously and in the last decade has been increased by all the configurations that require the use of special glass fixed to the structure no longer by means of simple retention at the perimeter but by means of couplings that act locally on the surface by means of holes and/or multiple millings thereof.

In all these described situations, the glass sheets are subjected to operating loads constituted by the people (and therefore with protection priority for example against falling into empty space), or by atmospheric loads such as wind, snow, thermal stresses, seismic stresses, etc. (which glass-making facilities must withstand, otherwise a risky situation would occur for the safety of people); obviously the provision of the holes and millings assumes a substantial importance both in terms of process, which must not introduce the possibility of triggering cracks, and in terms of geometry, which must interface with the sometimes complex structures for coupling, and in terms of aesthetics, if the regions that are worked remain visible with architectural or interior decoration functions.

Moreover, one field that is growing daily and also requires, in addition to the grinding of the perimetric edge, the drilling and milling of the glass sheets 1 is constituted by all applications that resort to the use of tempered glass sheets, such as those of interior decoration or electric household appliances.

Furthermore, a relevant and expanding field of use is the nautical and naval one, the glass sheets assuming an important proportion both in enclosure structures (windows and portholes) and in protection structures and interior decoration structures.

The drilling and milling of the glass sheet constitutes a very important added value that qualifies the product, especially if the work is performed with machines and methods that are less expensive than currently commercially available.

Moreover, the spread of shapes that are other than rectangular since they are polygonal or curvilinear or mixed enhances even more the value of the present disclosure, in contrast with the limitation of many widespread machines that can only work rectangular shapes.

The invention claimed is:

1. An automatic machine for drilling and milling a substantially flat glass sheet, having a rectangular or other than rectangular shape, the machine comprising:
   a machine body;
   an input conveyor provided with a motorized roller conveyor or a roller belt and adapted to convey the glass sheet by means of a lower edge thereof;
   an input conveyance surface provided with idle gliding wheels;
   an output conveyor provided with a motorized roller conveyor or a motorized belt and adapted to convey the glass sheet by means of said lower edge;
   an output conveyance surface provided with idle gliding wheels;
   a first carriage provided with a horizontal motion along a longitudinal axis X2;
   at least one pair of working heads, each of the working heads being provided so as to be independently movable for adjustment and feeding in a respective one of two axes Y1 and Y2 having a vertical component, each head bearing a respective tool provided with rotary cutting motion, and each of the tools being provided with a respective feeding motion along a respective one of axes Z1 and Z2 that are perpendicular to a face of the glass sheet,
   wherein at least one of the tools is adapted to make contact with a surface and therefore with a body of said glass sheet, wherein one of the two heads is also provided with a second carriage that performs a feeding motion along a longitudinal axis X1 while the other of the two heads is provided with at least one sucker that engages the surface of the glass sheet during processes performed by said one head or the opposite head or by the two heads simultaneously.

2. The automatic machine according to claim 1, wherein the first carriage is pre-positioned along the axis X2 as a function of a position of a portion of the glass sheet on which the working heads must work, and is provided with reference devices, in order to actuate slowing and stopping of the glass sheet when the glass sheet is in transit on the conveyors and is moved by the conveyors along the axis X2.

3. The automatic machine according to claim 1, wherein the first carriage is provided with suckers or clamps for coupling to the glass sheet.

4. The automatic machine according to claim 1, wherein the first carriage is capable of intervening so as to aid in repositioning the glass sheet, moved by the conveyors, and the second carriage is capable of performing multiple and progressive feeding motions along the axis X1, after release and subsequent re-engagement of the at least one sucker.

5. The automatic machine according to claim 1, wherein the two working heads are capable of being repositioned along the respective axes Y1 and Y2, so that one of the working heads performs multiple and progressive feeding motions, after disengaging and subsequently re-engaging the at least one sucker.

6. The automatic machine according to claim 1, wherein the at least one sucker is adjustable in position along a plane that is parallel to a plane of the glass sheet, by means of a respective actuator, in order to optimize placement of the at least one sucker as a function of a work field of the tools.

7. The automatic machine according to claim 6, wherein the at least one sucker, actuated by the respective actuator, being actuated by a motor that actuates the feeding motion of said other of said two heads along the axis Z2 and by a motor that actuates the feeding motion of said other of said two heads along the axis Y2, is arranged in a portion of the glass sheet that becomes waste after work on the glass sheet performed by the tools, and mates with said portion of the glass sheet and then guides said waste to a lower region of the machine preset to collect the waste, where said at least one sucker releases the waste.

8. The automatic machine according to claim 1, wherein the second carriage, which moves along the axis X1, is actuated in coordination with a third carriage, which moves along the axis Y1.

9. An automatic method for milling and drilling, the method comprising:
providing an automatic machine according to claim 1, for drilling and milling the substantially flat glass sheet, having a rectangular or other than rectangular shape,
wherein the two working heads are mutually opposite working heads with an interspace therebetween, wherein the glass sheet can be arranged in the interspace between the two mutually opposite working heads, with a longitudinal axis of the glass sheet extending along the longitudinal axis X2, wherein the tools are abrasive tools for working the glass sheet with a grinding process,
wherein in the milling operations, a feeding motion of the tool of a front one of the working heads along the longitudinal axis X1 or the feeding motion of said tool of the front working head along the axis Y1 or a combination of the two feeding motions of the tool of the front working head along the longitudinal axis X1 and the axis Y1, in a condition of interference of the tool of the front working head with the glass sheet, obtained by feeding the tool of the front working head along the axis Z1, is/are actuated only in a condition in which the sheet is coupled to the at least one sucker, which at least one sucker belongs to a rear one of the working heads and is at a border of a work field of the tool of the front working head.

10. The automatic method for drilling and milling according to claim 9, wherein in the drilling operations, the feeding motion of the tool of the front working head along the axis Z1 or the feeding motion of the tool of the rear working head according to the axis Z2 or the combination of the two feeding motions of the tool of the front working head along the axis Z1 and the feeding motion of the tool of the rear working head along the axis Z2 is/are performed only in the condition in which the glass sheet is constrained by the at least one sucker of the rear working head.

11. The automatic method for drilling and milling according to claim 9, wherein the first carriage aids in positioning of the glass sheet, and wherein the tool of the front working head performs multiple and progressive feeding motions along the axis X1, after release and subsequent re-engagement of the at least one sucker with the glass sheet.

12. The automatic method for drilling and milling according to claim 9, wherein the front working head is moved so that the tool of the front working head performs multiple and progressive feeding motions along the axis Y1, after deactivation and reactivation of the at least one sucker.

13. The automatic method for drilling and milling according to claim 9, wherein the tool of the front working head is moved along the axes X1 and Y1 in order to obtain a feeding motion of the tool of the front working head along a feeding path that provides a required shape to the glass sheet.

14. The automatic machine according to claim 1, further comprising a tool magazine in which the tool heads are configured to deposit the tools or pick up further tools.

* * * * *